Dec. 19, 1939.　　D. C. STOCKBARGER ET AL　　2,184,159
APPARATUS FOR MEASURING AREA
Original Filed July 11, 1936　　13 Sheets-Sheet 1
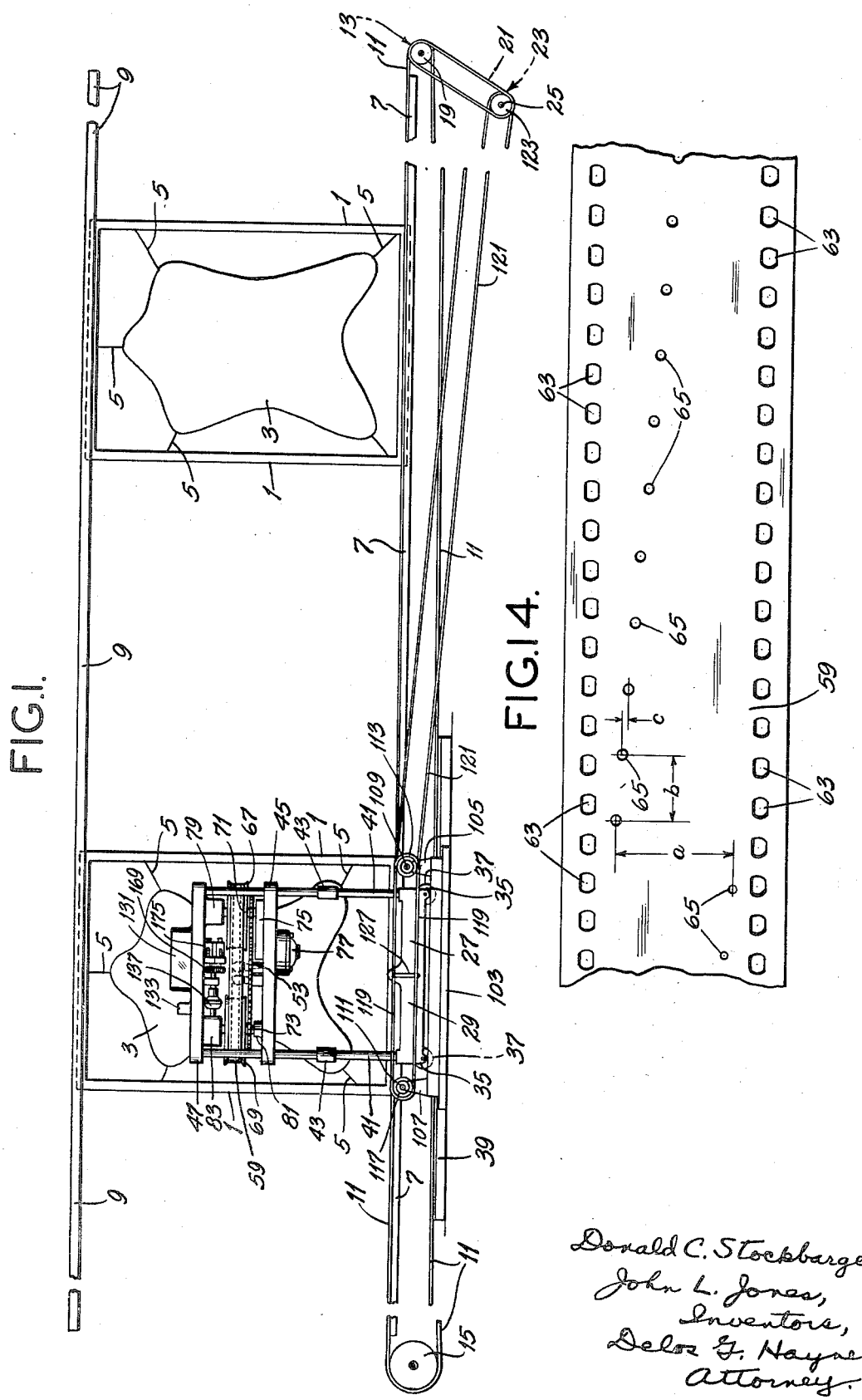

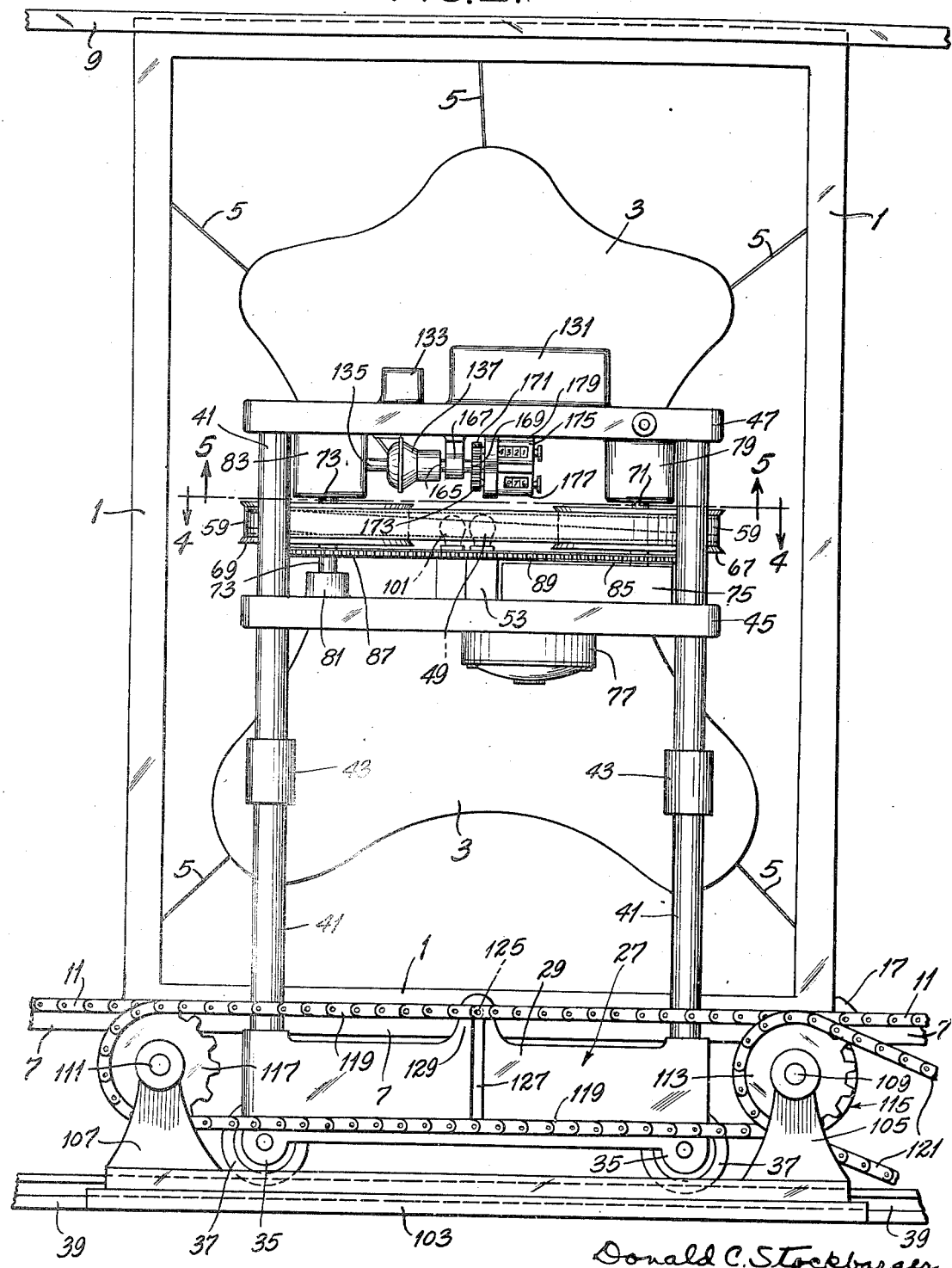

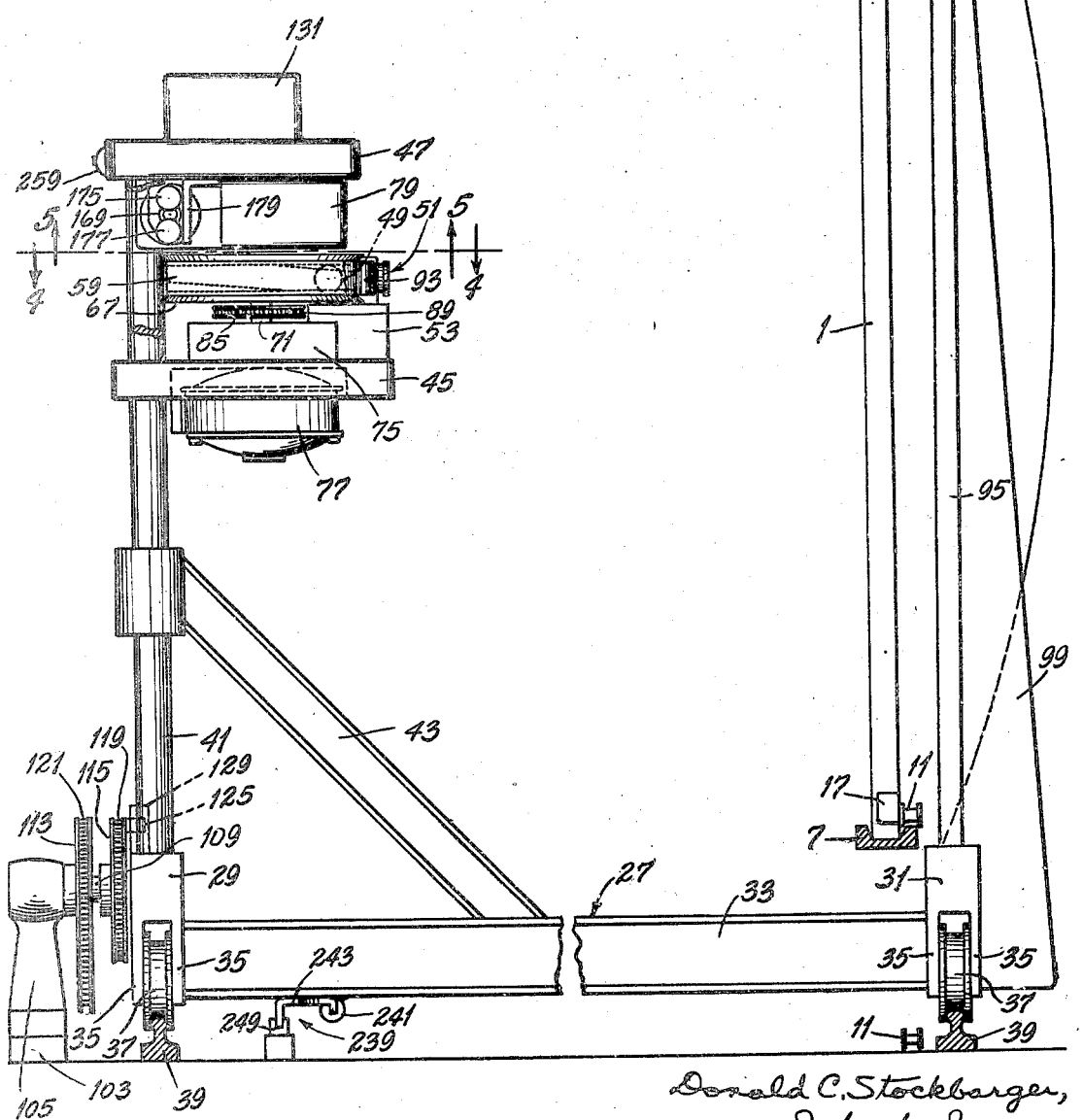

Dec. 19, 1939.  D. C. STOCKBARGER ET AL  2,184,159
APPARATUS FOR MEASURING AREA
Original Filed July 11, 1936  13 Sheets-Sheet 4
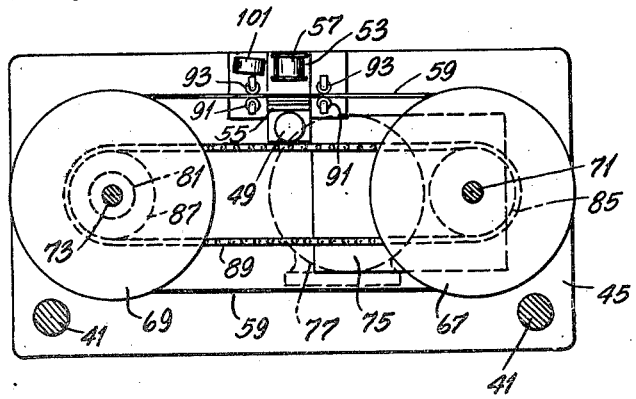
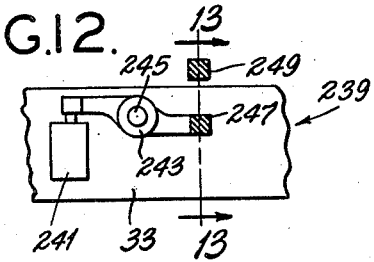
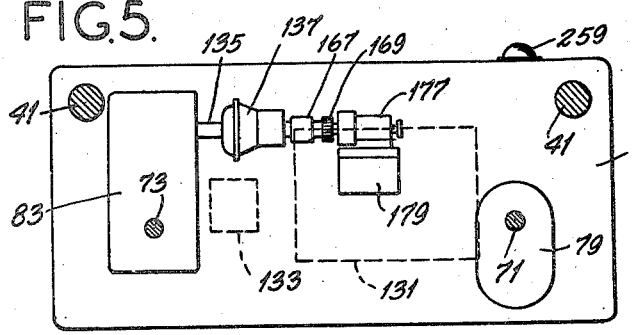
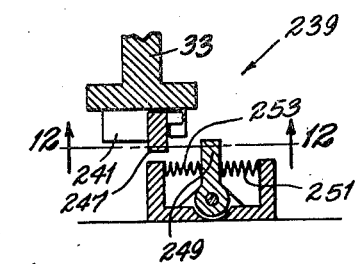
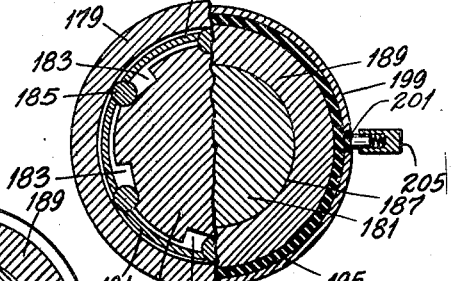
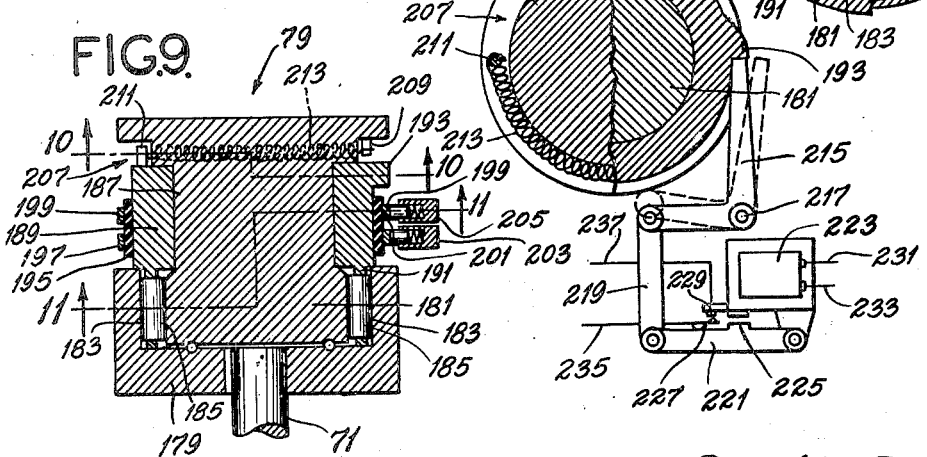
Donald C. Stockbarger,
John L. Jones,
Inventors,
Delos F. Haynes,
Attorney.

Dec. 19, 1939.   D. C. STOCKBARGER ET AL   2,184,159
APPARATUS FOR MEASURING AREA
Original Filed July 11, 1936   13 Sheets-Sheet 5
FIG.6.
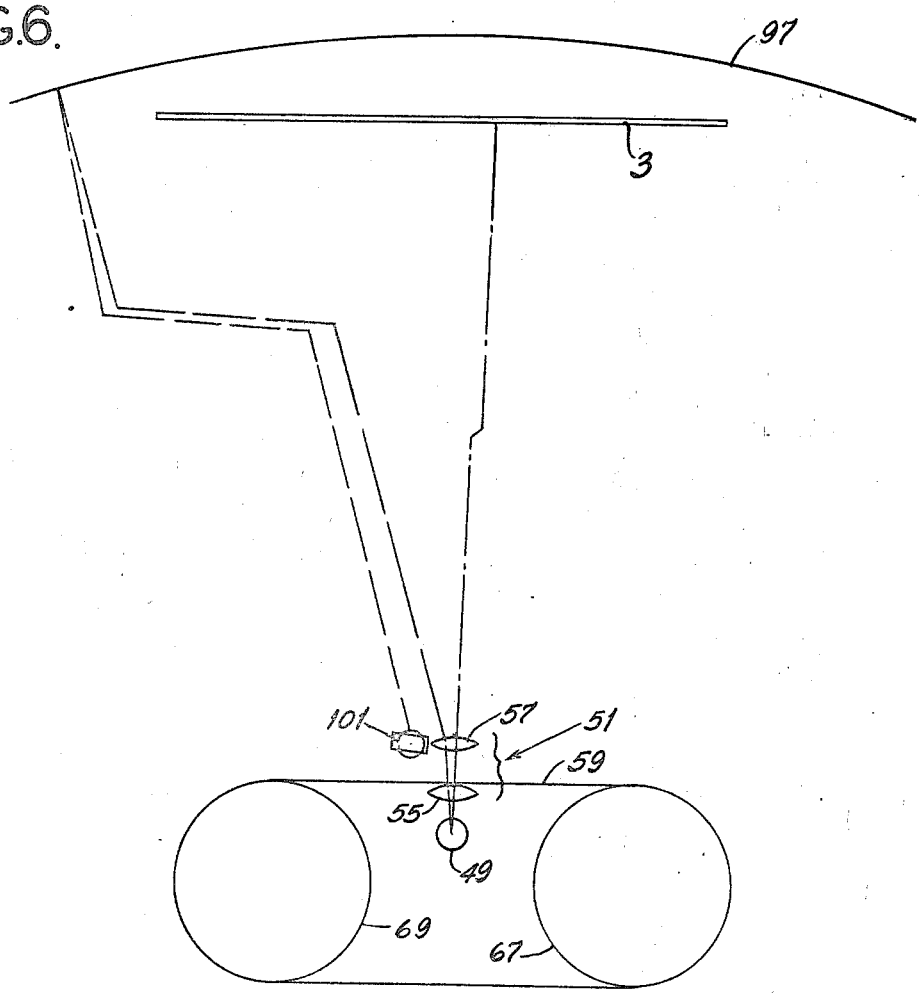
FIG.15.
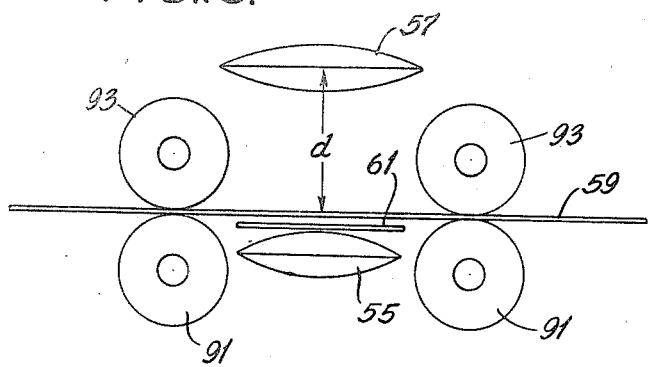
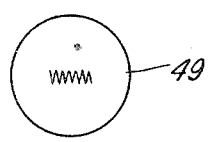
Donald C. Stockbarger,
John L. Jones,
Inventors,
Delos G. Haynes,
Attorney.

Dec. 19, 1939.　　D. C. STOCKBARGER ET AL　　2,184,159
APPARATUS FOR MEASURING AREA
Original Filed July 11, 1936　　13 Sheets-Sheet 6

Donald C. Stockbarger,
John L. Jones,
Inventors,
Delos G. Haynes,
Attorney.

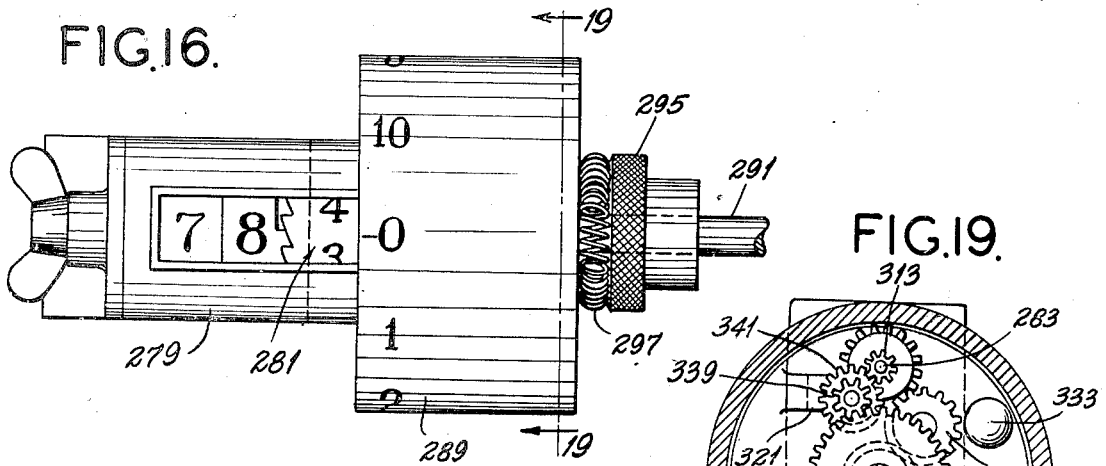
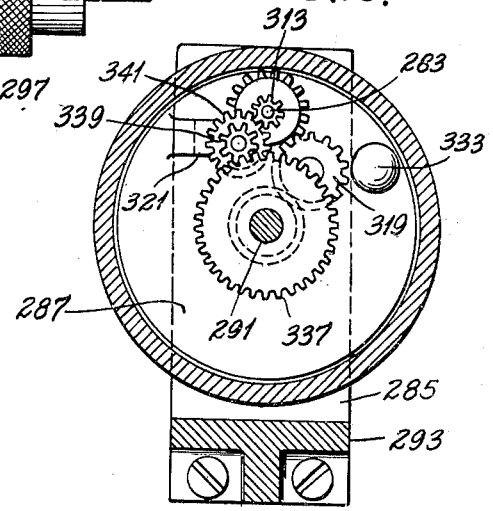
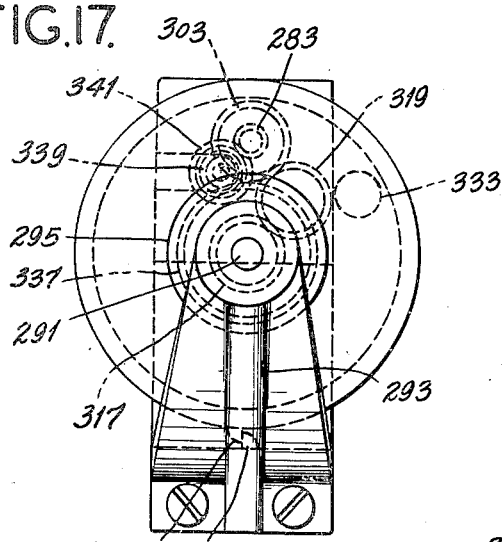
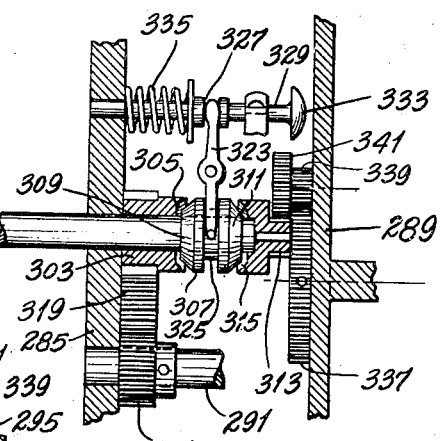
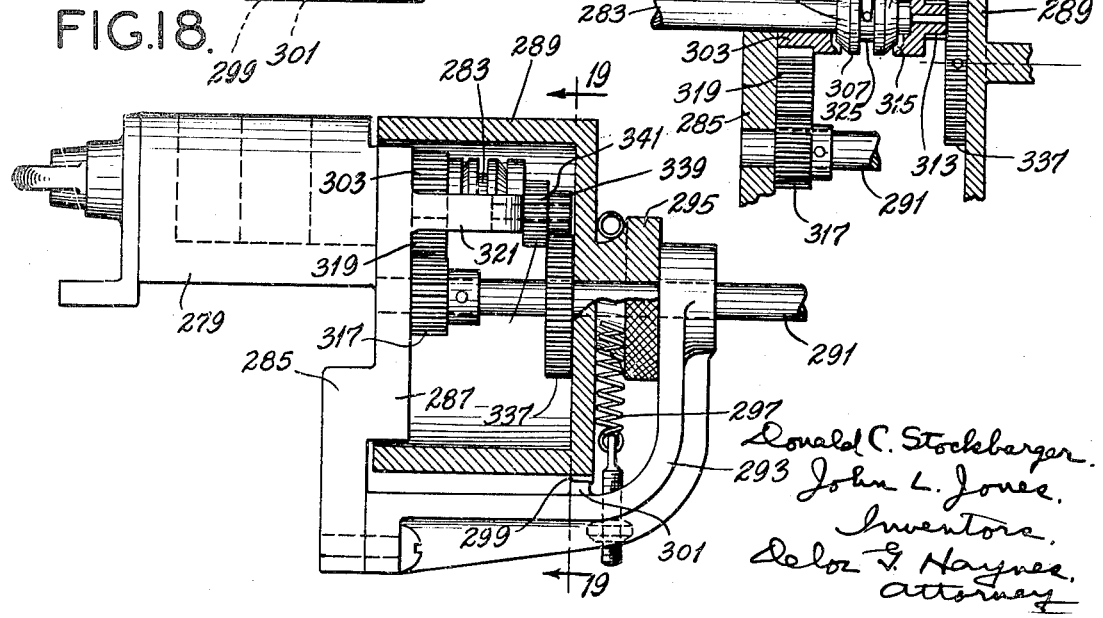

Dec. 19, 1939.　　D. C. STOCKBARGER ET AL　　2,184,159
APPARATUS FOR MEASURING AREA
Original Filed July 11, 1936　　13 Sheets-Sheet 8
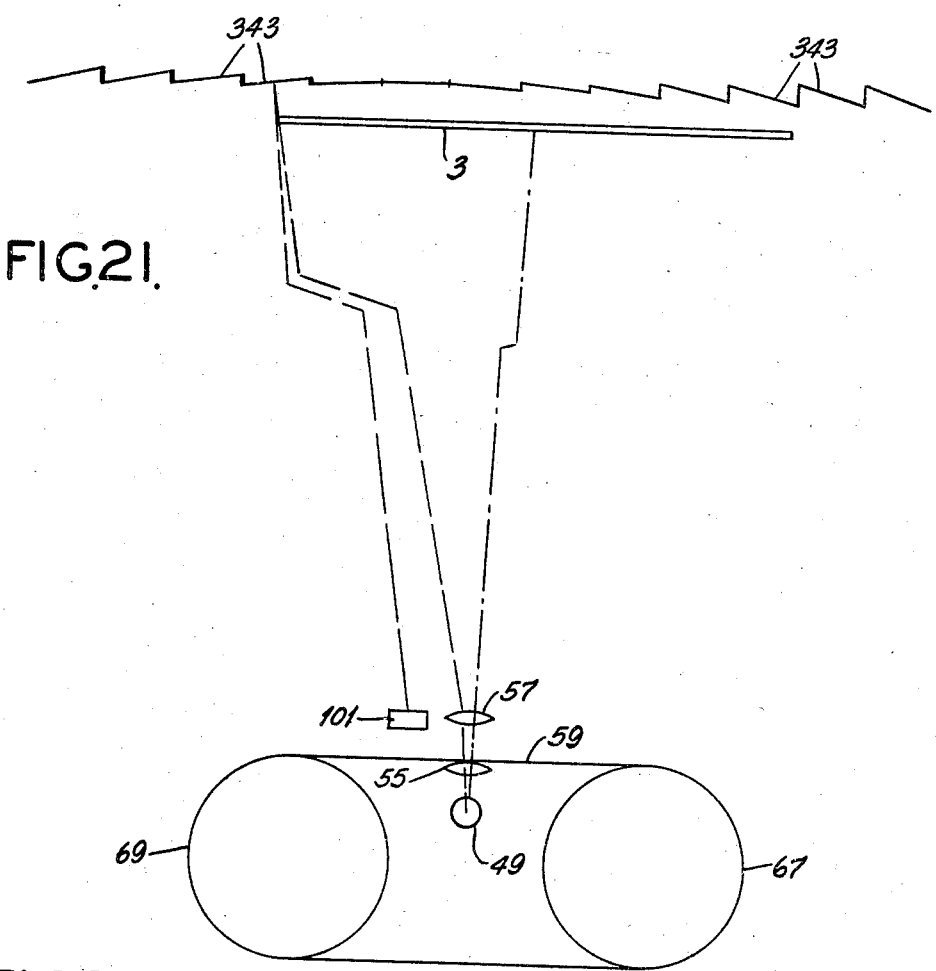
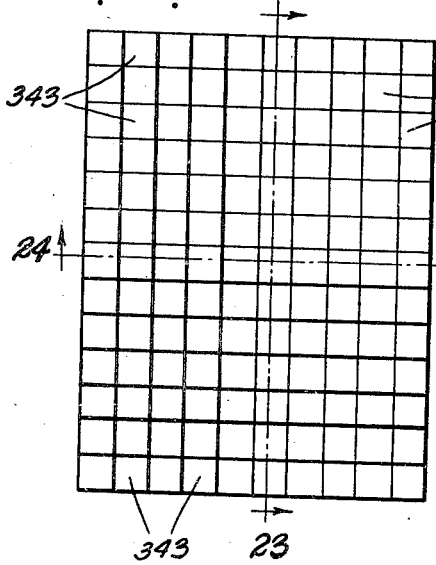
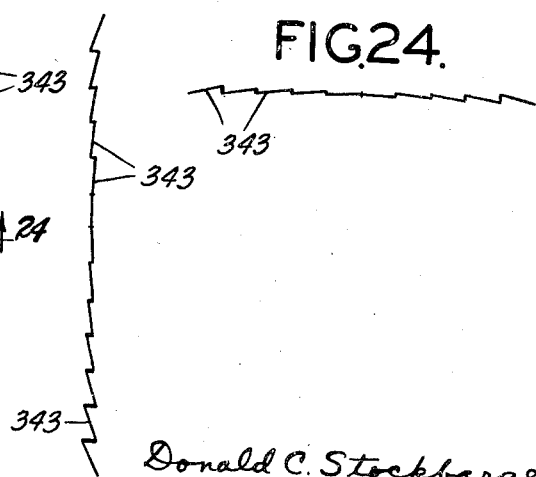
Donald C. Stockbarger,
John L. Jones,
Inventors,
Delos G. Haynes,
Attorney.

Dec. 19, 1939.    D. C. STOCKBARGER ET AL    2,184,159
APPARATUS FOR MEASURING AREA
Original Filed July 11, 1936    13 Sheets-Sheet 9

Donald C. Stockbarger,
John L. Jones,
Inventors,
Delos G. Haynes,
Attorney

Dec. 19, 1939.   D. C. STOCKBARGER ET AL   2,184,159
APPARATUS FOR MEASURING AREA
Original Filed July 11, 1936   13 Sheets-Sheet 10

TO AMPLIFIER

Donald C. Stockbarger,
John L. Jones,
Inventors,
Delos F. Haynes,
Attorney.

Dec. 19, 1939.  D. C. STOCKBARGER ET AL  2,184,159
APPARATUS FOR MEASURING AREA
Original Filed July 11, 1936  13 Sheets-Sheet 11
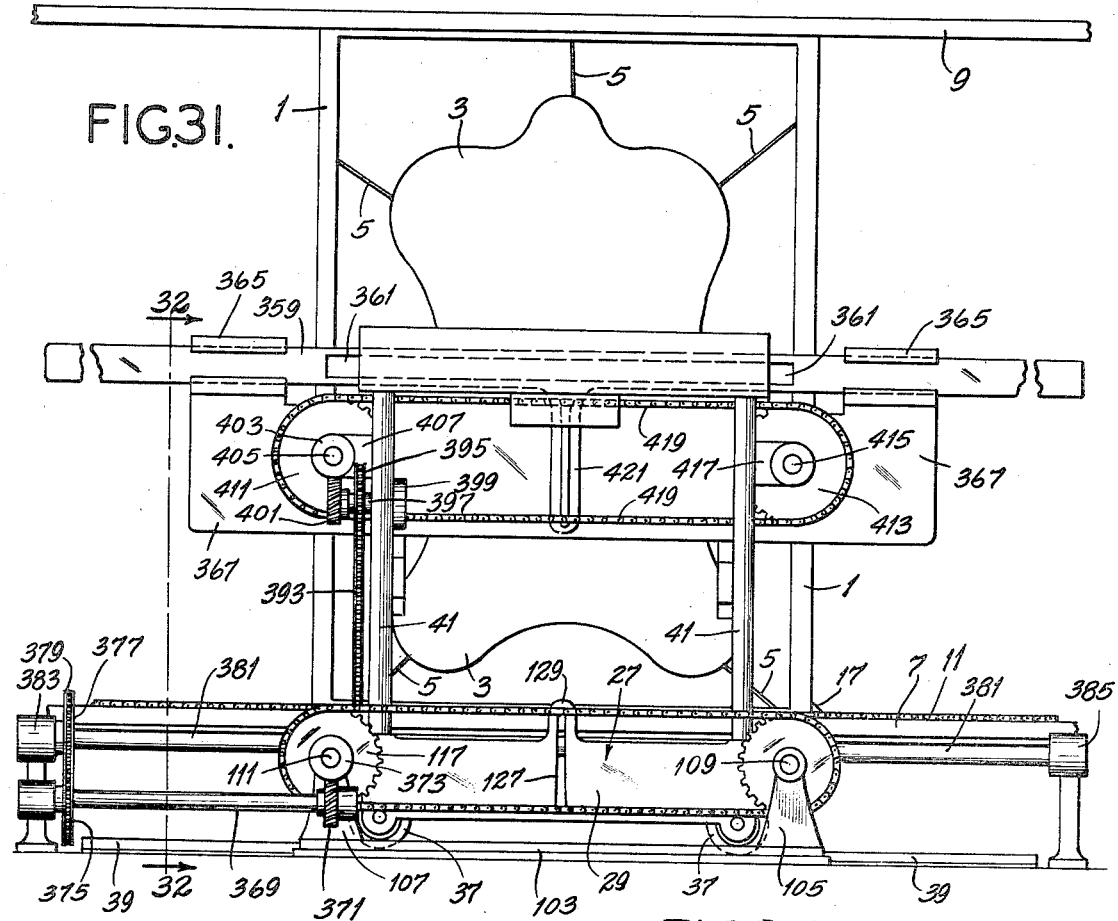

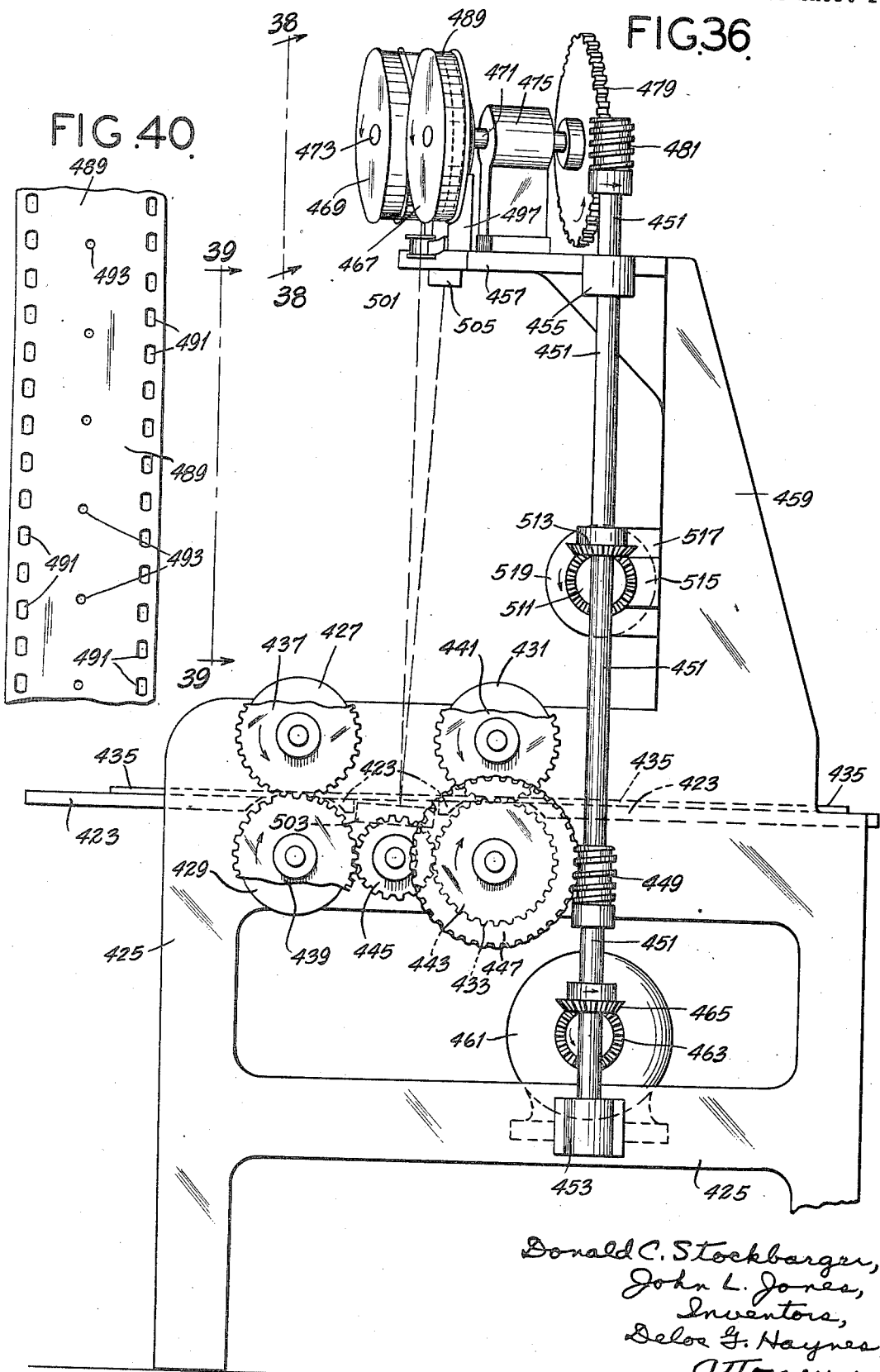

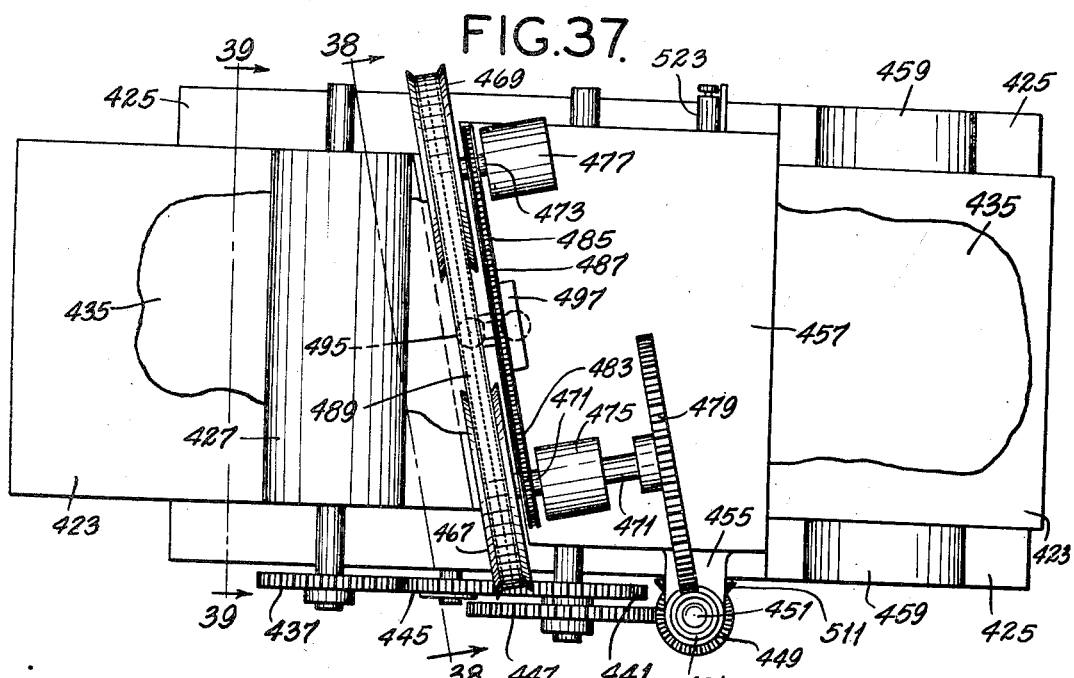
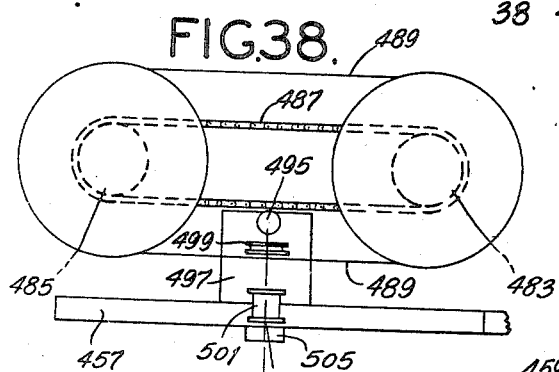
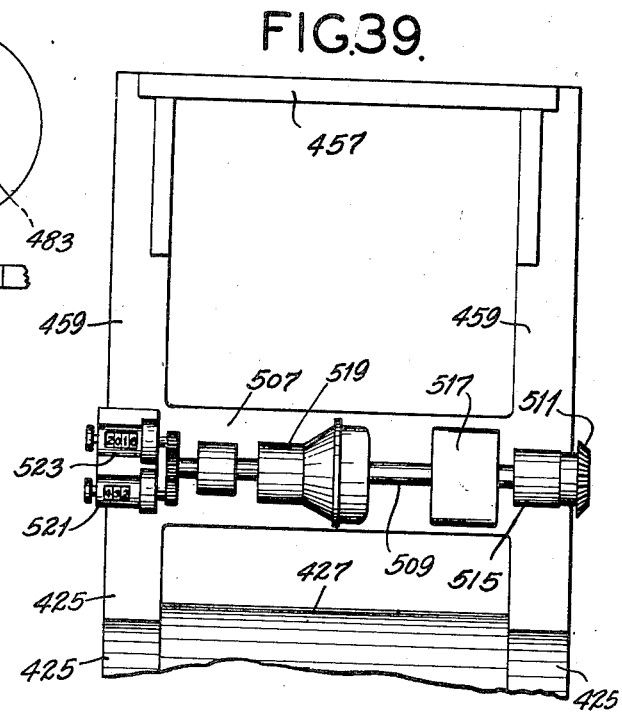

Patented Dec. 19, 1939

2,184,159

UNITED STATES PATENT OFFICE 2,184,159

APPARATUS FOR MEASURING AREA

Donald C. Stockbarger, Belmont, and John L. Jones, North Billerica, Mass., assignors to Stockton Profile Gauge Corporation, Lowell, Mass., a corporation of Massachusetts Application July 11, 1936, Serial No. 90,260
Renewed October 30, 1939

29 Claims. (Cl. 33—123)

This invention relates to the measurement of area, and with regard to certain more specific features, to apparatus for measuring area by the use of light-sensitive devices.

Among the several objects of the invention may be noted the provision of apparatus for measuring area wherein a beam of light, or a plurality of beams of light, are moved across a surface to be measured which is superposed on a surface of a different optical character, so that a photosensitive device will be actuated in accordance with the interference or non-interference of the light beam by the said surface, and in so regulating the travelled path of said beam or beams that their rate of movement, coupled with the duration of the actuation of the photosensitive device, will represent a true mathematical expression of the area of the said surface; the provision of apparatus of the class described wherein the surface to be measured is scanned by beams of light which trace straight-line, parallel paths on the surface, and in which the beams all originate in a common immobile light source; the provision of apparatus of the class described wherein the surface to be measured is moved constantly and continuously, either with the scanning device or relative thereto, without thereby producing errors in measurement; the provision of scanning apparatus which is adapted to trace parallel straight-lines on the surface to be scanned, from a relatively immobile light source; the provision of apparatus of the class described which continuously moves the surfaces to be measured, thereby making the operation an automatic, continuous one; and the provision of apparatus of the class described which is simple to operate and which yields results of an inherent high accuracy. Other objects will be in part obvious and in part pointed out hereinafter.

The invention accordingly comprises the elements and combinations of elements, and features of construction and operation, which will be exemplified in the apparatus hereinafter described, and the scope of the application of which will be indicated in the following claims.

In the accompanying drawings, in which are illustrated several embodiments of the present invention, Fig. 1 is a front elevation of area measuring apparatus built in accordance with the present invention;

Fig. 2 is an enlarged fragment of Fig. 1;

Fig. 3 is an end elevation of the apparatus shown in Fig. 2;

Fig. 4 is a horizontal section taken substantially along line 4—4 of Fig. 3;

Fig. 5 is a horizontal section taken substantially along line 5—5 of Fig. 3;

Fig. 6 is a diagrammatic representation of the optical system embodied in the apparatus of the preceding figures;

Fig. 9 is an axial cross section of a one-turn clutch mechanism;

Figure 25:
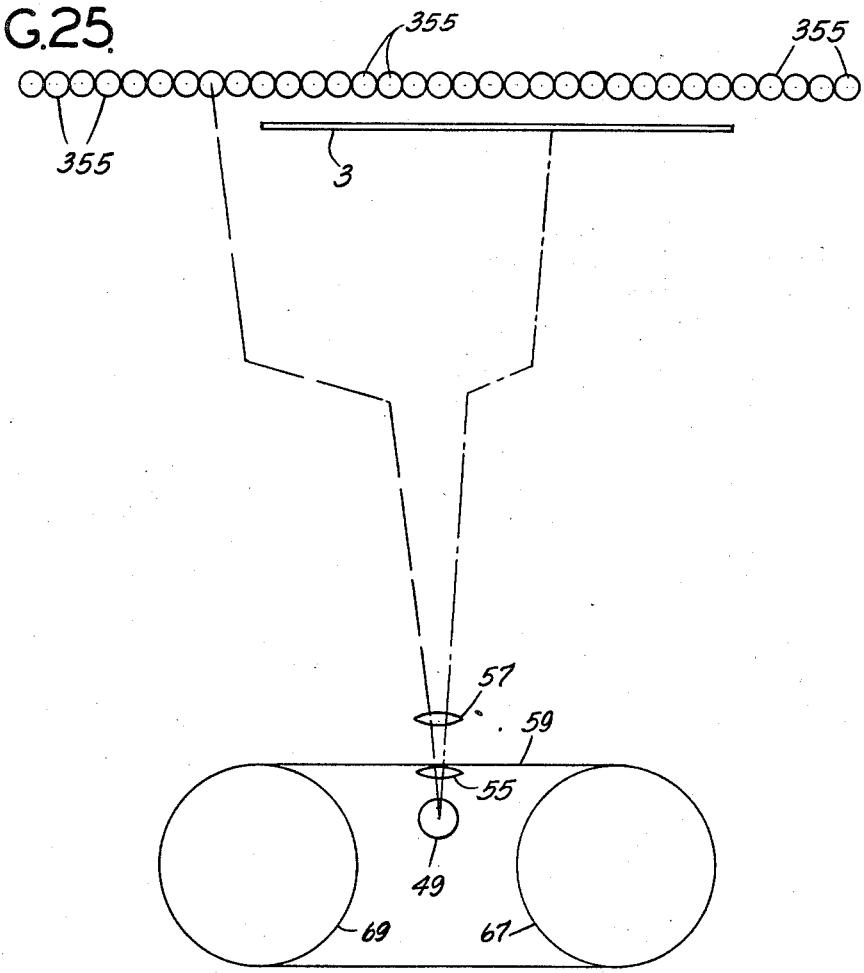
Figure 27:
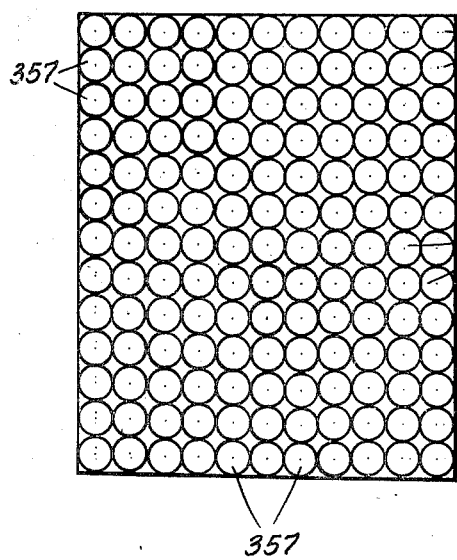
Figure 26:
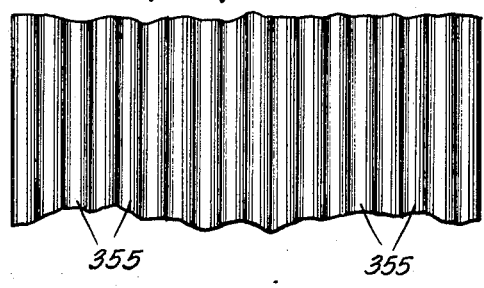
Figure 28:
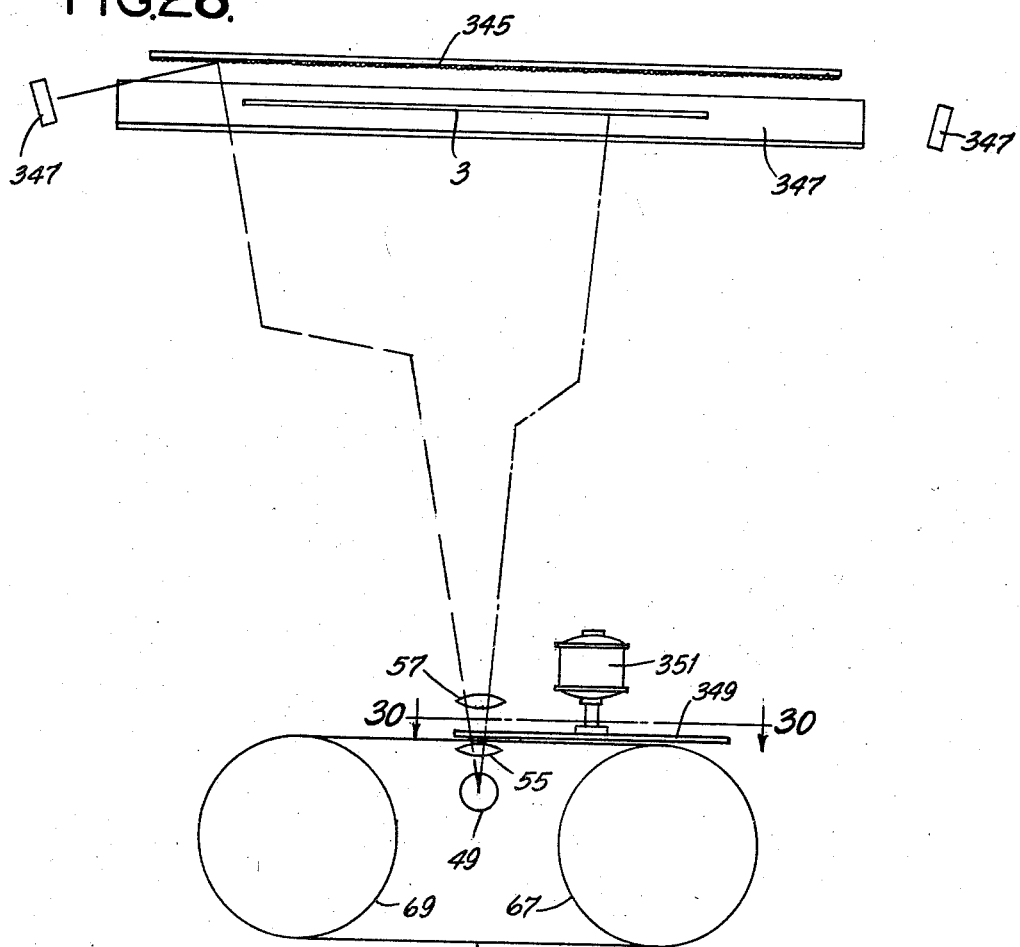
Figure 29:
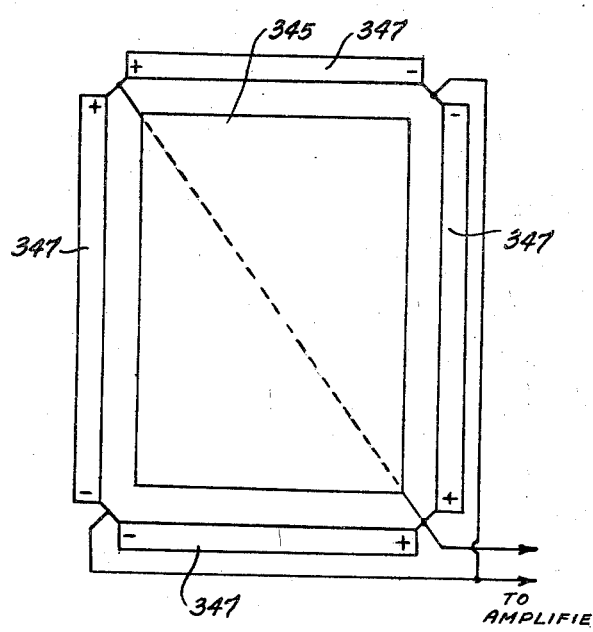
Figure 30:
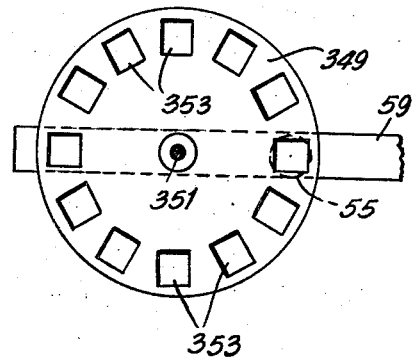

Figures 10 and 11 are sections taken substantially along lines 10—10 and 11—11 of Fig. 9;

Fig. 12 is a horizontal section of a switch;

Fig. 13 is a vertical section taken substantially along line 13—13 of Fig. 12;

Fig. 14 is an enlarged fragmentary view of a scanner belt;

Fig. 15 is an enlarged diagrammatic view of an optical system;

Fig. 16 is a top plan view of a counter;

Fig. 17 is an end elevation of the counter of Fig. 16;

Fig. 18 is a side elevation of the counter of Fig. 16, certain parts being broken away;

Fig. 19 is a cross section taken substantially on line 19—19 of Figures 16 and 17;

Fig. 20 is an ideal section of the counter of Fig. 16;

Fig. 21 is a diagrammatic view similar to Fig. 6, illustrating another embodiment of the invention;

Fig. 22 is a front elevation of a reflector used in the Fig. 21 embodiment;

Fig. 23 is a vertical section taken substantially along line 23—23 of Fig. 22;

Fig. 24 is a horizontal section taken substantially along line 24—24 of Fig. 22;

Fig. 25 is a diagrammatic view similar to Fig. 6, illustrating still another embodiment of the invention;

Fig. 26 is a fragmentary elevation of a bank of photosensitive tubes used in the Fig. 25 embodiment;

Fig. 27 is a diagrammatic front elevation of a bank of photosensitive devices alternative to the showing of Fig. 26;

Fig. 28 is a diagrammatic view similar to Fig. 6, illustrating still another embodiment of the invention;

Fig. 29 is a diagrammatic front elevation of a reflector assembly used in the Fig. 28 embodiment;

Fig. 30 is a section taken substantially along line 30—30 of Fig. 28, illustrating a light chopper disc;

Fig. 31 is a front elevation of another embodiment of the invention;

Fig. 32 is a vertical section taken substantially along line 32—32 of Fig. 31;

Fig. 33 is a vertical section taken substantially along line 33—33 of Fig. 32;

Fig. 34 is an enlarged fragmentary front elevation of a scanner frame used in the Fig. 31 embodiment;

Fig. 35 is an enlarged vertical section taken substantially along line 35—35 of Fig. 34;

Fig. 36 is a side elevation of another embodiment of the invention;

Fig. 37 is a top plan view of the embodiment of Fig. 36;

Fig. 38 is a diagrammatic fragmentary front elevation of the embodiment of Fig. 36, taken substantially as indicated by line 38—38 in Figures 36 and 37;

Fig. 39 is another diagrammatic fragmentary front elevation of the embodiment of Fig. 36, taken substantially as indicated by line 39—39 of Figures 36 and 37; and, Fig. 40 is an enlarged fragmentary plan view of a scanner belt used in the embodiment of Fig. 36.

Similar reference characters indicate corresponding parts throughout the several views of the drawings.

One method heretofore proposed for the measurement of the area of work pieces by photoelectric methods comprises scanning the work piece with successive beams of light that are reflected to a photosensitive device so that the device responds differently to reflected light from the work piece as contrasted to reflected light from its background, and then integrating the responses with the rate of travel of the scanning beam across the work to obtain an expression of area of the work piece.

A difficulty with this method of measurement has been that it is limited by the character of the scanning apparatus available. The only scanning device heretofore suggested for this purpose has been the well-known Nipkow scanning disc, which comprises a circular disc rotating on its axis, and provided with a spiral arrangement of holes near its periphery, through which holes the scanning light beam is projected. The rotation of the disc causes the projected scanning beam to traverse one dimension, while successive holes provide for successive beams which, taken as a bundle, traverse the other dimension. With this type of scanning device, the integrating mechanism has been coupled to the rotating disc for rotation therewith, on the supposition that the angular displacement of the scanning disc was a true linear function of the rate of travel of the spot of light caused by the interception of the scanning beam by the work piece. It can, however, be proved that this supposition is not geometrically true, because the rate of travel of the spot across the work depends upon which hole of the scanning disc is causing its beam, since the various holes are located at differing radial distances from the center of the scanning disc, and hence move at correspondingly differing circumferential speeds.

Thus the angular displacement of the scanning disc is not a true linear function of the rate of travel of the light spot, and an integrating mechanism coupled to the disc does not record true areas. The error, further, is not constant, as a single work piece placed to cover one part of an inspected field will give one area reading, while the same work piece placed in another part of the inspected field may give another area reading. Thus such a system cannot be used to measure a succession of different work pieces of different shapes and areas with any assurance of high accuracy of the results.

A principal object of the present invention is to provide an area measuring system of the scanning type in which the foregoing errors are not encountered, or in other words, a scanning system wherein the rate of movement of the scanning device is a true linear function of the rate of movement of the light spot it produces, so that an integrating device may be coupled to the scanning device, and, with suitable other provisions, give a true expression of the area of the work piece, regardless of what position it occupies in the inspected field. Several embodiments of such systems are shown in the drawings, and described hereinafter.

A further disadvantage of the scanning type of area measuring systems heretofore proposed is that they make no provision for the automatic measuring of a succession of work pieces. They require, for example, that a work piece be manually placed in the inspected field, measured, and manually removed from the field before another piece can be measured. Commercial operations do not ordinarily permit so time-consuming a procedure. A further principal object of the invention, accordingly, is to provide the measuring system with automatic means for presenting, measuring, and withdrawing a rapid succession of work pieces.

Since an important commercial use of the invention is in the measurement of leather, tanned skins, and the like, the invention is here disclosed as embodied in machines adapted more especially for this purpose. The machines illustrated are designed to practice a method which may be described briefly as embodying the steps of moving a beam of light across a known area in which the surface to be measured is interposed, in such a manner as to scan increments of said area, and detecting and indicating the number of such increments of area that are either covered or uncovered by said surface. The method thus determines the area of said surface or gives information from which the area can readily be determined.

It will be observed that in this method the area to be measured, or the known area in which the surface to be measured is interposed, may be considered as divided into a multitude of increments of area arranged in an orderly fashion convenient for scanning. In the case of the known area above referred to, the scanning operation detects the presence of those increments not covered by the work, and these increments are counted. Since the function of the scanning beam is to determine whether or not successive increments are covered, it obviously is not essential that the scanning beam cover the entire area of each increment. Assuming, for example, that these increments of area are represented by the spaces in coordinate or quadrille paper, the beam may be made equal to the width of a row of these spaces and may sweep across the entire row, but it will perform essentially the same function if it is considerably smaller than the width of such a row and sweeps across the center line of the row. In either event the beam will scan successive spaces in the row, and by using a suitable detector with it, it can be made to tell which spaces are covered by the work. The word "scan," therefore, is used herein to include the training of light on a surface for the purposes here described, and the width of the strip the area of which is to be determined by the scan may be somewhat greater than the width of the scanning beam.

Of course, it is desirable that the scanned path or increment be as narrow as conveniently possible, because the narrower the path, the smaller will be the error introduced by the terminal effect of the work piece. By terminal effect is meant that small edge fragment of the work piece that overlaps the scanned path a small distance insufficient to record on the photosensitive device, the area of which is therefore not counted, or which overlaps the scanned path sufficiently to be counted, but insufficiently actually to represent the area indicated by the count.

For the purposes of simplicity, the apparatus of the first embodiment of the present invention may be considered as made up of a work feeding mechanism, a scanning system (comprising a beam projector and a beam reflector or interceptor), a scanning system feeding mechanism, a detection system, and an integrating system giving expressions of area as an end result. These various portions of the apparatus will be separately described, and then correlated in the description of the operation of the apparatus as a whole.

Work feeding mechanism

The work feeding mechanism of the present invention is shown in Figures 1, 2, and 3. Rectangular frames 1, of wood or metal or other suitable material, are provided for each of the hides 3 to be measured. The hides 3 are attached to the frames 1 by strings 5, a multiplicity of which are provided around the interior edge of the frame to take care of different sizes and shapes of hides. The strings 5 stretch the hide 3 so that its maximum surface area is presented to the front of the frame. In other words, the hide is stretched so that its plane is in the plane of the frame. The frames 1 are commonly provided in tanneries for stretching the hides 3 during their tanning, and hence the positioning of the hides 3 on the frames 1 ordinarily requires no additional work.

Numerals 7 and 9 indicate, respectively, horizontal slides or tracks in which the frames 1 are vertically positioned. Both slides 7 and 9 have channeled cross-sections (see. Fig. 3), the channel of the lower slide 7 facing upwardly while the channel of the upper slide 9 faces downwardly. The slides 7 and 9 are of considerable length, and are supported in spaced relation (by means omitted from the drawings for the sake of clarity) such that the frames 1 slide freely therebetween, but are nevertheless accurately positioned in a preferably vertical plane.

Numeral 11 indicates an endless chain belt which is supported by sprocket wheels 13 and 15 at its ends. Intermediate idler sprocket wheels (not shown) may be provided for preventing the upper lap of the chain 11 from sagging, or the upper lap may travel in a channel or, for example, on top of the slide 7 as shown. At suitably spaced intervals, the chain belt 11 is provided with dogs 17 which extend over the slide 7 in position to abut the edge of a hide frame 1. The spacing of the dogs 17 will be indicated hereinafter.

On the same shaft that supports the sprocket wheel 13 there is mounted a second sprocket wheel 19, which receives an endless chain belt 21 that also passes over a sprocket wheel 23 on a main drive shaft 25. Suitable motivating force is provided for the main drive shaft 25, so that the belt 11 is driven from the sprocket wheel 13. The direction of rotation is such that the upper lap of the belt 11 moves from the right to the left in Fig. 1. The dogs 17 of the belt 11 thus propel along the slides 7 and 9 whatever frames 1 they engage.

Scanning system

The scanning system of the present invention is shown in Figures 1, 2, 3, 4, 5, 6, 7, 14, and 15. Its supporting mechanism will first be described.

Numeral 27 (Figures 2 and 3) indicates a carriage that comprises a hollow rectangular frame having front and back pieces 29 and 31, respectively, and side pieces 33. At their extreme ends, the front and back pieces 29 and 31 are provided with bearing extensions 35 which rotatably support flanged wheels 37 that run on tracks 39. The tracks 39 are disposed parallel to the slides 7 and 9 of the work feeding mechanism. The carriage 27 is moved by the scanning system feeding mechanism hereinafter to be described.

The front piece 29 supports the beam projector means, while the back piece 31 supports the beam reflector means.

Mounted on the front piece 29 at its extreme ends are a pair of upstanding pillars or posts 41. The posts 41 are desirably braced to the cross pieces 33 by struts 43. A horizontal shelf 45 is supported on the posts 41 somewhat below the upper ends thereof, and a parallel shelf 47 is provided at the upper ends of the posts 41. The shelves 45 and 47 support the beam projector mechanism, which generally comprise a light source 49, an optical or lens system indicated generally by numeral 51, and a scanning device forming a particular feature of the present invention.

The light source 49 may comprise an incandescent filament bulb of the concentrated filament type, as usually used for projection equipment, or any other source of sufficient area and intensity. It is so mounted (on a block 53) that its filament is positioned mid-way, vertically, between the upper and lower inner edges of the work-supporting frame 1. It is preferably shielded, or provided with a reflector system such as used in small motion picture projectors. As little stray light as possible is allowed to escape in other directions.

The optical or lens system 51 may best be described by reference to Figures 6 and 15. It comprises a lens 55, which throws an image of the source 49 on a second lens 57. Between the lenses 55 and 57 is positioned a scanner belt 59, to be described in greater detail hereinafter. The second lens 57 ordinarily throws an image of a hole in the scanner belt 59 on the work piece or hide 3. It will be understood that either one or both of the lenses 55 and 57 may be. and frequently are, compound lens systems in themselves. The lenses 55 and 57 are mounted in position on the block 53, and are desirably provided with focusing means so that they can be adjusted to optimum positions with relation to the light source 49, the scanner belt 59, and the work piece 3, prior to actual measuring operations. The front of the rear lens 55 is desirably provided with a mask 61 (see Fig. 15), the opening of which is equivalent to the image of the frame 1 rearwardly projected by the lens 57 on the mask 61. This mask 61 provides a cut-off for scanning beams, limiting their travel to dimensions inside the frame 1. The mask 61 is preferably mounted directly on the lens 55, and the entire system is arranged so that the scanner belt 59 is as close to the mask 61 as practically feasible.

The scanner belt 59 is in the form of a thin endless band of flexible material. The material may, for example, be steel of a thickness not greatly exceeding the order of 0.005 inch. The width of the belt 59 depends upon many factors, such as the area to be scanned (the area of the frames 1), the width of the scanned paths across the work, and the lens system employed. However, for a frame size of five by seven feet, which is suitable for practically all hides, the belt 59 may conveniently be of the same order of width as ordinary commercial motion picture film (35 millimeter). The edges of the belt 59 are provided with sprocket holes 63 (see Fig. 14), in this respect also resembling motion picture film. The length of the belt 59 is determined by many factors including its rate of travel, the lens system employed, and the desired width of the scanned paths across the work piece. The belt 59 is punctured or perforated with a series of holes 65 along its length, the holes 65 being arranged on gradually sloping lines so that the complete band, of the preferred embodiment, has two complete lines from uppermost hole to lowermost hole. The holes 65, passing between the lenses 55 and 57, determine beams of light which are the scanning beams of the invention. As a given hole 65 passes through the lens system, it defines a beam that moves across the work piece 3 at a vertical height determined by the location of the hole 65 on the belt 59, with respect to the lens system, which beam moves in a horizontal straight line, since the hole itself, with the belt, moves in a horizontal straight line. As one beam completes its traverse of the frame 1, a next hole 65 is brought into the lens system, producing another beam which is vertically just above or just below the preceding beam, depending upon the direction of movement of the belt 59. From this brief description of the operation of the device, it will be seen that the positioning of the holes 65 on the belt 59 is determined by the character of the scanning work to be done. With the assumed frame size of five by seven feet, the horizontal distance between holes 65 (dimension b in Fig. 14) will need to be the length of the image of a five-foot line at the frame 1 projected by the lens 57 on the belt 59. Assuming that the lens 57 is a projector lens having an opening of "f 1.9" and a focal length of 25 millimeters, and the frame 1 to be ten feet from the lens 57, this dimension works out to about 0.5 inch. The vertical distance between a topmost hole 65 and a lowermost hole 65 of a preceding series of holes (dimension a in Fig. 14) will similarly need to be the length of the image of a seven-foot line, which, with the same system, works out to be about 0.7 inch. The vertical distance between adjacent holes 65 (dimension c in Fig. 14) depends primarily upon the number of scanning lines to be included in the vertical length of the frame 1. If one scanning line is determined to be one inch wide, then a total of eighty-four lines will be needed for seven feet, and eighty-four lines will require eighty-four holes 65 spaced equally within the overall dimension a, which works out, in the foregoing example, as one one hundred and twentieth of an inch. By analogous reasoning, each hole 65 should be not greater than one one hundred and twentieth of an inch in diameter, or the scanned paths on the work will overlap vertically.

Some of the dimensions in Fig. 14 have been exaggerated for clarity, and are not to be considered proportional to the dimensions actually used.

The reason for the extreme thinness desired in the belt 59 is now more apparent. If a thick band were used, the opening 65 as it passed farther from the optical center of the system would tend to present more and more an eliptical opening for the scanning beam to traverse, the limiting condition being the absolute eclipse of the beam. At the least, this would mean that the spot of light produced on the work would be weaker towards the peripheries of the work, which would be undesirable in connection with the photosensitive device employed. A thin belt, however, reduces such eclipsing to a disregardable amount.

The supporting means for the belt 59 will next be described. Numerals 67 and 69 (Figures 2, 3, and 4) indicate drums which are mounted on shafts 71 and 73, respectively. The drums 67 and 69 each are provided with flanges at their outer edges, which tend to guide the belt 59 into proper vertical position, and with projections about their peripheries which mesh with the openings 63 along the edges of the belt 59. The lower end of the shaft 71 is supported in a geared transmission 75 which is mounted on the shelf 45. The transmission 75 is of customary construction. A motor 77 is suspended from the under side of the shelf 45, its shaft projecting into the other end of the gear train of the transmission 75 in order to drive the shaft 71 (and hence drum 67) to rotate, through the transmission 75. The transmission 75 provides that the drum 67 will rotate at the proper speed, which is usually much lower than the speed of rotation of the motor 77. The upper end of shaft 71 is supported in a single-turn clutch 79, to be described in connection with the integrating mechanism.

The lower end of shaft 73 is mounted in a bearing 81 on shelf 45. The upper end of shaft 73 is supported in a gear multiplier box 83, likewise to be described in connection with the integrating mechanism.

A pair of sprocket wheels 85 and 87 are mounted on shafts 71 and 73, respectively, just below the drums 67 and 69. A link belt 89 connects the sprocket wheels 85 and 87. This arrangement provides that the shaft 71 drives the shaft 73, and since wheels 85 and 87 are of identical size, the drums 67 and 69 rotate at identical speeds. This direct drive of shaft 73 from shaft 71 releases driving tension that might otherwise be disadvantageously placed in the scanner belt 59.

In order to prevent whipping of the belt 59 as it passes between the lenses 55 and 57 (which might lead to imperfect focusing) aligning idler rollers 91 and 93 (Figures 4 and 15) are provided to position the belt 59. The rear rollers 91 are on fixed pivots, and determine the placement of the belt 59, while the front rollers 93 are preferably spring-pressed to hold the belt 59 against the rear rollers 91.

The beam reflector means heretofore referred to is supported by means of vertical standards 95 (see Fig. 3) mounted on the rear piece 31 of the carriage 27. The rear piece 31, it will be seen, is positioned behind the slides 7 and 9, and is thus behind the frame 1 and work piece 3. However, this spacing is desirably made as close as conveniently possible. The reflector per se of the present embodiment of the invention comprises a spherical mirror 97, the geometrical center of which is approximately the optical center of the forward lens 57. For the dimensional example heretofore given, a mirror radius of a little over ten feet is satisfactory. The specular or reflecting side of the mirror 97, of course, faces the lens 57. Trusses 99 are desirably provided to reinforce the standards 95, and a sufficient number of cross bars between the standards 95 aid to support the mirror 97.

The mirror 97 may be of any suitable type, and need not be made all in one piece. Perhaps the most economical mirror for use in connection with the present invention, however, is a spun, specularly polished aluminum mirror.

Referring again to Fig. 6, it will be seen that the purpose of the mirror 97 is to reflect back light beams issuing from the lens 57 approximately to their source. As a matter of fact, it is desirable that the reflected beams come back to a point a little to the side of the lens 57, to the location of a photosensitive cell 101 (to be described hereinafter). Hence the center of curvature of the mirror 97 should accurately be midway between the lens 57 and cell 101.

*Scanning system feeding mechanism*

If the scanning system just described were held stationary while the work 3 moved past it on the slides 7 and 9, it is apparent that no area measurement could be accomplished. Therefore the apparatus provides means for moving the scanning system with the work until the given work piece is measured, after which the scanning system is moved back to commence moving forward with a subsequent work piece.

Referring again to Figures 1, 2, and 3, it will be seen that a stationary base 103 is provided, upon the ends of which are mounted bearing brackets 105 and 107 rotatably supporting shafts 109 and 111 respectively. The shaft 109 carries a pair of sprocket wheels 113 and 115. The shaft 111 carries a sprocket wheel 117, which is positioned in the plane of the sprocket wheel 115. An endless chain belt 119 passes over the wheels 115 and 117. The belt 119 is positioned as close as possible to the front piece 29 of the scanner mechanism carriage 27. Another chain belt 121 passes over the sprocket wheel 113 and a second sprocket wheel 123 on the main drive shaft 25.

Sprocket wheels 13, 19, 23, 113, 115, 117, and 123 are all the same size. It is accordingly seen that the upper lap of chain belt 119 will move in the same direction, and at precisely the same speed, as chain belt 11.

Chain belt 119 carries a sidewardly-projecting pin 125 (Figures 2 and 3) which fits slidably into a slot 127 in the middle of the front piece 29 of the carriage 27. An upward extension 129 is provided in the front piece 29 in order that the slot 127 may extend upwardly to the level of the upper lap of belt 119. The slot 127 extends downwardly as low as the lower lap of chain belt 119. It will now be seen that, as chain belt 119 moves, it carries the carriage 27 along with it. Provided the pin 125 is on the upper lap, the carriage 27 will move with the belt 119, and hence with the belt 11 and the work piece 3. As the chain 119 moves at a uniform velocity, so will the carriage 27 move with a uniform velocity, until it reaches the ends where the chain belt 119 is in contact with its sprocket wheels 115 and 117, at which time the carriage will move at a varying speed because the pin 125 will have a vertical as well as a horizontal component of movement. When the pin 125 is on the lower lap of the belt 119, the carriage 27 will move against the belt 11, and the work 3. During this phase the carriage is being returned to perform the measurement of a succeeding work piece.

By means to be described hereinafter, the entire area measurement of a given work piece is accomplished while the carriage 27 is moving with the work 3. While the scanner belt 59 runs continuously, no area measuring is done while the carriage is going through reverse movement, or through non-linear movement at either end of its travel.

It will now be seen that, for proper operation, the frames 1 must be spaced on the slides 7 and 9 at intervals such that the leading edges of each succeeding frame are separated by a distance equal to the entire length of chain belt 119. This positioning is achieved by properly positioning the dogs 17 on the chain belt 11.

It will now also be seen that the tracks 39 for the carriage 27 must extend a distance beyond each end of the base 103 at least equal to, and preferably a few inches more than, half the width of the carriage front piece 29, in order to support the carriage 27 throughout its entire travel.

*Detection system*

The detection system of the present invention is based upon the operation of the photosensitive device 101, and is subject to wide modification, as will be apparent in the descriptions of modifications given hereinafter. In the present embodiment, the detection system comprises the photosensitive device 101, and an electrical amplifier 131 and relay 133, both of which are mounted, for example, on the top of shelf 47 (see Figures 2 and 3).

The photosensitive device 101 may be any one of the types currently available, such as photoelectric cells, electron multipliers, bolometers, and the like. If certain types of photoelectric cells are used, then for most successful amplification of the impulses received, the light source should be of an intermittent character. The provision of intermittent light is described in connection with the modifications to appear hereinafter. For the present embodiment, the cell 101 may, for example, be a Weston "Photronic" cell, in which event an intermittent light source is not needed.

The cell 101 is placed, as has been indicated, as nearly as possible to the focal point of rays reflected from the mirror 97. This means that so long as any scanning ray is not intercepted by the work piece 3, it will be reflected to and actuate the cell 101. If no work piece is present, a complete scan will cause the cell to be constantly energized, and it will develop a continuous current for a time equal to the time taken for the scanning beams to traverse the entire presented surface of the mirror 97. When a work piece 3 is interposed before the mirror 97, however, during the time that successive scanning beams are intercepted by the surface of the work piece, no light will be reflected to the cell 101 (or at least so little light will be reflected that, by adjusting the constants of the amplifier 131 and the relay 133, its effect may be disregarded), and hence the output current in the relay circuit will be stopped. The time that the output current is stopped represents accurately the area of the work piece. This area is determined and recorded by the integrating system to be described.

The characteristics of the amplifier 131 vary with the type of the photosensitive device used, and are well known for each such device. The construction of the relay 133 is also well known and need not be described herein. The function of the relay 133 of the present embodiment is to hold an exterior circuit open so long as light falls upon the photosensitive device 101, but to close said exterior circuit the instant the light ceases to fall on the photosensitive device, or diminishes below a certain level.

Integrating system

Since the scanning beams of the present invention travel in straight equidistant, parallel lines, and since all scanning beams travel across the scanned surface at the same uniform speed (uniform both as to the speed of a single beam while traversing the surface scanned, and as to the speed of the several beams taken with relation to each other), the total time that all the scanning beams of one complete measurement are intercepted by the work piece is an accurate expression of the area of the piece. The integrating mechanism of the present invention is accordingly designed to compute and express this total time, and in addition to provide means to assure that a single work piece is not measured more than once.

The speed of rotation of either one of the drums 67 and 69 is an accurate expression of the speed of movement of the scanning beams, for the foregoing reasons. Therefore the integrating system of the present invention is operated, in one aspect, by the shaft 73 of drum 69. Shaft 73 enters and drives a multiplier gear 83, which is of standard construction, and which delivers the impulse of shaft 73 at a higher but proportional speed to a countershaft 135 at right-angles to the shaft 73 (see Figures 2, 5, and 7). The countershaft 135 drives an electro-magnetic clutch 137, which is shown in greater detail in Fig. 8. The countershaft 135 is the drive shaft for this mechanism, and has a driving disc 139 secured fast on it, the shaft 135 being mounted in ball bearings. A driven shaft 141 is also mounted in ball bearings and is supported coaxially with the shaft 135. The driven shaft 141 carries a rotor 143. All of this mechanism is mounted within a stationary housing or casing. The rotor 143 is provided with two conical surfaces 145 and 147, one of which is arranged to engage a complemental surface 149 on the housing and normally is held in contact with it by a spiral spring 151. Thus the surface 149 acts as a brake, and since there is no power tending to drive shaft 141 when it is thus braked, the rotor 143 is held stationary. At one end of the casing is an electro-magnet comprising a stationary coil 153 and an armature 155 mounted at the end of said coil and normally held away from it by three coiled springs, one of which is shown at numeral 157. The armature 155 has a loose engagement with a sleeve 159 threaded on a bushing 161 in which the ball bearings are mounted for supporting the shaft 141. When coil 153 is energized, it moves armature 155 to the right, and this movement produces a corresponding movement of the bushing 161 to the right, together with the bearings mounted therein, the shaft 141, and the rotor 143. Adjusting screws, one of which is shown at numeral 163, serve to limit the extent of this movement, and it is made of such an amplitude that the conical surface 147 of rotor 143 engages the complemental surface of driven disc 139 and establishes a driving connection between shafts 135 and 141. This continues until the coil 153 is de-energized, at which time the spring 151 immediately moves rotor 143 to the left into contact with braking surface 149, thus stopping almost instantly the rotation of shaft 141. The shaft 141 is in fact hollow, and slidably carries an inner shaft 165 therein. The shafts 141 and 165 are splined together, so that their rotation is coextensive. Shaft 141 is required to move longitudinally with the movements of the clutch, but shaft 165 is longitudinally stationary.

Shaft 165 is carried in a bearing 167 (Figures 2 and 5) which is arranged to prevent its longitudinal movement. The opposite end of shaft 165 carries a pinion 169, which actuates the driving pinions 171 and 173 of counters 175 and 177, respectively. The counters 175 and 177 are mounted on a bracket 179 (see also Fig. 3) which is in turn mounted on the under side of shelf 47. The upper counter 175 totalizes the measured areas of all work pieces passing the device. The lower counter 177 totalizes only the area of each individual work piece, and is then manually or automatically returned to zero for the next work piece. The counters may be controlled (as by the ratio in the gear multiplier box 83, and the ratio of the sizes of pinions 169, 171, and 173) to read area directly in whatever dimension (such as square inches or square feet) that is desired.

While the counters 175 and 177 may be any of the commercially-available continuous revolution counters, it has been found advisable, from the standpoint of the accuracy with which the counters are read, to use a modified form of commercial ratchet counter that is novel with the present invention. This modified form is shown in Figures 16, 17, 18, 19, and 20 of the drawings, to which reference is now directed.

The ordinary commercial counter, which is used as a whole in this modified form, is indicated at numeral 279. A difficulty encountered when using these counters is that, at the completion of a counting operation such as is involved in the measurement of areas by the methods herein described, the last digit disc of the counter (indicated by numeral 281 in Fig. 16), is frequently at a position intermediate two digits (such as the "3" and "4" indicated in Fig. 16). The structure of the counter is such that the relative position of intermediacy cannot readily be estimated; for example, in Fig. 16, it is not possible to say with accuracy that the counter reads "783.3", "783.4", "783.5", "783.6", or "783.7". The present modified counter makes it possible to read the commercial counter, in such situations, to an accuracy represented by one, and possibly two more digits.

The structure of the commercial counter indicated at numeral 279 is such that it is driven by rotatable shaft 283 (see Figures 19 and 20). In the present modification, this shaft is not, however, directly coupled to the shaft (such as the shafts of driving pinions 171 and 173) the rotation of which it is desired to measure.

Numeral 285 indicates a bracket upon which the counter 279 is mounted. Shaft 283 extends through the bracket 285. The bracket 285 has a forwardly-projecting disc-shaped portion 287, upon which rotates a cup-shaped enclosing member 289. The cup 289 is cylindrical, and through it, on its axis, passes the main drive shaft 291 the rotation of which it is desired to measure. The shaft 291 turns freely in the cup 289, however, and rotates therewith under no conditions. The shaft 291 is supported exteriorly of the cap 289 by a side bracket 293 mounted on the bracket 285.

The cup 289 has a projecting knurled knob portion 295, which forms a part thereof. Around the groove of the knob is secured a tension spring 297, the other end of which is secured to the bracket 293. The spring 297 tends at all times to return the cup to a starting position, represented by the engagement of a projection 299 on the cup with a projection 301 on the bracket 293. The outer periphery of the cup 289 carries indicia facing in the same manner as the indicia of the counter 279. Normally these indicia should be in the decimal system, if the counter 279 is so arranged, ranging either from zero to ten, as shown, or from zero to one hundred. The zero index comes up on a line with the indicia of the counter 279 when the projections 299 and 301 are engaged.

Interiorly of the cup 289, the countershaft 283 carries a pinion 303, which has a concave conical clutch face 305 at its outer end. The pinion 303 is free to rotate on the shaft 283. The shaft 283 also carries a splined, but longitudinally movable clutch collar 307 having a conical face 309 adapted to engage the face 305 of the pinion 303, and a similar oppositely-facing conical face 311 at its other end. On the end of shaft 283 is mounted a second pinion 313 having an inward concave conical face 315 adapted to engage face 311 of collar 307. The second pinion 313 is also free to rotate on the shaft 283. The longitudinal spacing of pinion 303, collar 307, and pinion 313 is such that the collar 307 may be moved into engagement with either pinion, but not with both at the same time.

Main drive shaft 291 at its inner end carries a pinion 317 that is fixed to rotate therewith. A pinion 319 is mounted on the bracket 285 in such manner as to drive pinion 303 from pinion 317.

Numeral 321 (Fig. 18) indicates a bracket that extends forwardly from the bracket 285, carrying at its end a pivot on which rotates a yoke lever 323. The lower end of lever 323 slides in a groove 325 on the clutch collar 307. The upper end of lever 323 slides in a grooved collar 327 which is fixedly mounted on a pin 329. The pin 329 slides longitudinally in the bracket 285. The pin 329 extends forwardly to terminate as a head 333 that is closely juxtaposed to the inner face of cup 289. A compression spring 335 reacts on the pin 329 so as to tend to maintain it in its forwardly extended position.

Numeral 337 indicates a gear that is mounted on the inner face of cup 289, concentric with the shaft 291 but unattached thereto. The gear 337 meshes with a pinion 339 mounted on a shaft that is in turn mounted on the cup 289. Fixed for rotation with the pinion 339 is a pinion 341 which meshes with the pinion 313 on shaft 283.

The tendency of the spring 335 is to force the pin 329 to such a position that the lever 323 moves collar 307 so that the face 309 engages and drives the face 305 of pinion 303. Under these conditions, which represent normal operation condition, the pinion 303 drives shaft 283, and is in turn driven directly by shaft 291 through pinions 317 and 319. The pinions 303 and 317 are both of the same size, so that the shaft 291 thus drives the countershaft 283 in a one to one rotation.

However, if the knob 295 is forced inwardly against the counter 279, the inner face of the cup 289 bears on head 333 to move the pin 329 against the spring 335, causing the lever 323 to move to its opposite position, bringing its conical face 311 into driving relation with the face 315 of pinion 313, and disengaging pinion 303. When the cup 289 is now rotated, it drives the countershaft 283 through the gear train 337—339—341—313. The ratio through this gear train is such that a complete turn of the cup 289 is required to move the digit dial of the counter one full digit.

In operation, the cup 289 is not molested until the end of a given count, where the digits are in the intermediate position heretofore noted. Thereupon the cup 289 is pushed inwardly and rotated sufficiently to turn the last digit disc of the counter 279 backwardly until the lower-value digit showing is brought to a full position. The amount the cup 289 has been rotated to do this, as indicated by the indicia on the cup, will represent the extent that the counter had originally passed beyond that digit. For example, referring again to Fig. 16, if, after rotating the cup 289 so as to bring up the digit "3" on the last digit disc of the counter 279 into full position, the cup indicia (on a scale of one hundred) read "55", then the true reading of the counter at the termination of the count was "783.55". After this determination, the spring 297 returns the cup 289 to its zero position for another count.

It is thus seen that the commercial counter 279 is modified by the provision of a vernier device that can be placed into operation at will, and the accuracy of the counter 279, so far as its reading is concerned, is thus greatly enhanced.

It will be recalled that the scanning belt 59 has been described as continuously moving, and since the light source 49 is also continuously burning, provision must be made for preventing more than one complete series of scanning holes 65 from effectively controlling the integrating mechanism, otherwise a given work piece might be measured more than once and an erroneously large total area recorded. The mechanism that performs this control is considered as part of the integrating mechanism, and will next be described.

The circumference of each drum 67 and 69 is made exactly equal to the length of a single series of scanning holes 65 (a single series being topmost hole to topmost hole). It will be recalled that the scanning belt was described as containing two complete series of scanning holes 65. This diametrical relation of the drums 67 and 69 means that one rotation of either drum will represent a complete scan of a given work piece. Means (comprising the one-turn clutch mechanism 79 heretofore indicated) are accordingly provided for rendering the photosensitive cell 101 ineffective to control the electro-magnetic clutch 137 (and hence the counters 175 and 177) for more than one complete revolution of the drum 67 for any one work piece 3.

The one-turn clutch mechanism 79 is shown in greater detail in Figures 9, 10, and 11, to which reference is now directed. The drum shaft 71 is keyed to a rotating outer sleeve member 179. An inner cam member 181 is mounted for rotation within the sleeve member 179, and has peripheral recesses 183 for receiving rollers 185. The cam member 181 has a cylindrical portion 187, on which frictionally rotates a second sleeve 189. The sleeve 189 has a cylindrical retainer ring portion 191 which extends into the sleeve member 179 and retains the rollers 185. The sleeve 189 has a peripheral projection or stop 193. On the outer surface of the sleeve 181 is tightly fitted a sleeve 195 of electrical insulating material, and on the sleeve 195 are tightly fitted two collector rings 197 and 199. The rings 197 and 199 are electrically connected together. The ring 197 is continuous, but the ring 199 has a single short "dead spot" 201. Brushes 203 and 205 are provided for continuously contacting the rings 197 and 199.

The cam member 181 is outwardly flanged above the end of the sleeve 189, providing a groove 207 therebetween. A pair of pins 209 and 211 are mounted, oppositely facing, on the cam member 181 and the sleeve 189, and a tension spring 213 connects the two pins, lying in the groove 207.

Numeral 215 indicates a bell crank lever that is pivoted at 217. One end of the lever 215 is positioned to engage or free the stop 193 on the sleeve 189, while the other end is connected by a link 219 to a first-class lever 221 mounted on an electro-magnet 223. The lever 221 has a pole piece 225 formed as a part thereof, the pole piece 225 being responsive to the magnet 223. The lever 221 also carries a movable electrical contact 227 which cooperates with a fixed contact 229 mounted on the magnet 223. Electrical connections are made to the magnet 223 by wires 231 and 233, while connections are made to the switch comprising the contacts 227 and 229 by wires 235 and 237.

Normally the sleeve 179 rotates continuously with the drum 67, but the sleeve 189 is held immovable by the engagement of stop 193 with the end of lever 215. This holds the roller retainer 191 in such position that the rollers 185 are idling, being incapable of establishing a driving connection between the sleeve 179 and the cam member 181. However, the instant the lever 215 is moved out of locking position, by actuation of the electromagnet 223 in a manner to be described, the spring 213, reacting against the inertia of the cam member 181, rotates the sleeve 189 enough forward so that the retainer 191 brings the rollers 185 into a driving connection between the sleeve 179 and the cam member 181. The cam member 181 thereupon commences to rotate, carrying the sleeve 189 frictionally with it. Meanwhile, the magnet 223 has been de-energized, permitting the lever 215 to return to a locking position, so that, immediately upon the completion of a single revolution, the sleeve 189 is stopped by the re-engagement of the stop 193 with the lever 215. The stopping of the sleeve 189 moves the retainer 191 so that the rollers 185 are again brought to idling position. The rotation of the cam member 181 stops as soon as its inertia has been overcome by the spring 213, which thus stores tension for the next revolution.

The dead spot 201 on the collector ring 199 is positioned so as to be under its brush 205 when the sleeve 181 is stopped. Thus current does not flow in exterior connections when the sleeve 181 is not rotating, but flows across from brush 203 to brush 205 as long as the sleeve 181 is rotating. In order to make sure that current will flow instantly upon the commencement of rotation of the sleeve 181 (and hence obviate the small time lag occasioned by the necessary area of the dead spot 201), the brushes 203 and 205 are connected in parallel (see Fig. 7) with the switch contacts 227 and 229. The contacts 227 and 229 are instantaneously brought together to complete a circuit when the electro-magnet 223 is energized; these contacts are separated a short time later, when the electro-magnet 223 is de-energized, but in the meantime the same circuit will have been separately closed by the brushes 203 and 205 and the collector rings 197 and 199.

The means for energizing the electromagnet 223 comprises a circuit (Fig. 7) including a switching device 239, which is shown in Figures 3, 12, and 13. It will be recalled that an "effective" measurement is desired only when the various feeding mechanisms have brought up a new work piece for measurement. This condition is achieved when the carriage 27 of the scanning mechanism is at its extreme right-hand position, in Figures 1 and 2. Hence the movement of the carriage 27, as it comes up to its extreme right-hand position, ready to commence its movement to the left, is used to actuate the switch 239.

The switch 239 may comprise any suitable device, but is constructed, for example, as shown in Figures 12 and 13. A standard type spring "plunger" switch 241 is mounted on the under side of one of the cross-pieces 33 of the carriage 27, with its axis along the line of movement of the carriage. A lever 243 is pivoted at 245, with one end in position to actuate the plunger of the switch 241. The other end of the lever has a downward projection 247. A dog 249, which is pivoted and extends high enough to intercept the projection, is mounted at the proper place on the supporting floor for the entire measuring apparatus. The dog 249 moves back and forth with the movement of the carriage. Two springs 251 and 253 react oppositely on the dog 249 to hold it approximately vertical. The spring 251 is sufficiently strong so that when the carriage 27 passes, the lever 243 is forced to rotate, causing the switch 241 to be actuated. However, the spring 251 permits the dog 249 to pass the projection 247 after the switch 241 has been actuated. When the carriage 27 moves to the left in Fig. 13, the dog 249 drives the lever 243 to rotate in a non-actuating direction, and the switch 241 is not actuated.

This arrangement provides that the switching device 239 is actuated only when the carriage 27 commences its leftward movement, or, in other words, is ready to commence the measurement of a new work piece. The actuation of the switch 239 is only of a short duration, as will be understood, but this short actuation is sufficient to actuate the electro-magnet 223 which in turn permits the one-turn clutch 79 to undergo a single revolution, and to hold the contacts 227 and 229 together until brush 205 moves off dead spot 201.

Figure 7:
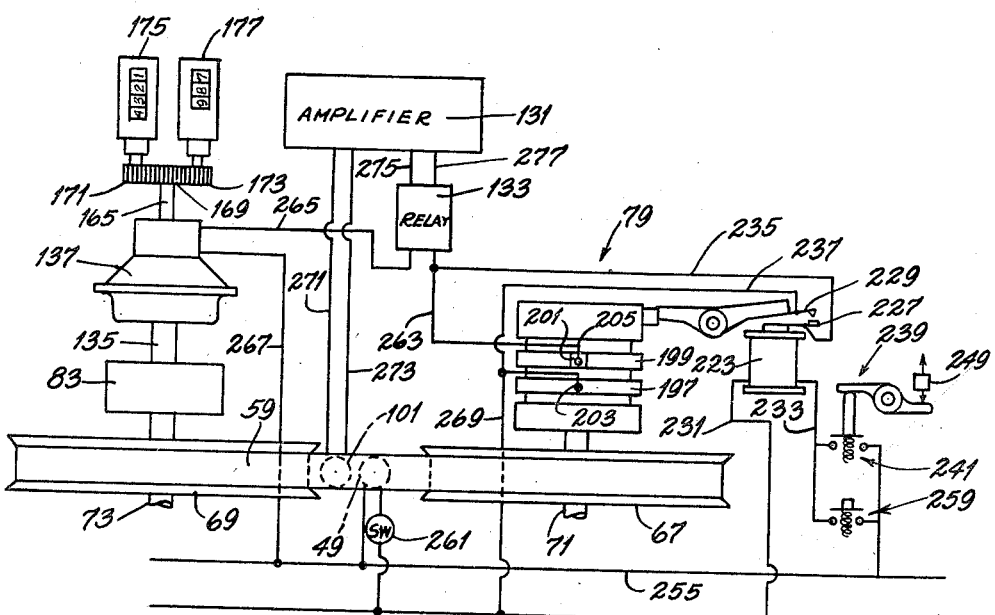
Fig. 7 is a diagrammatic representation of the electrical system embodied in the apparatus of the preceding figures.
Figure 8:
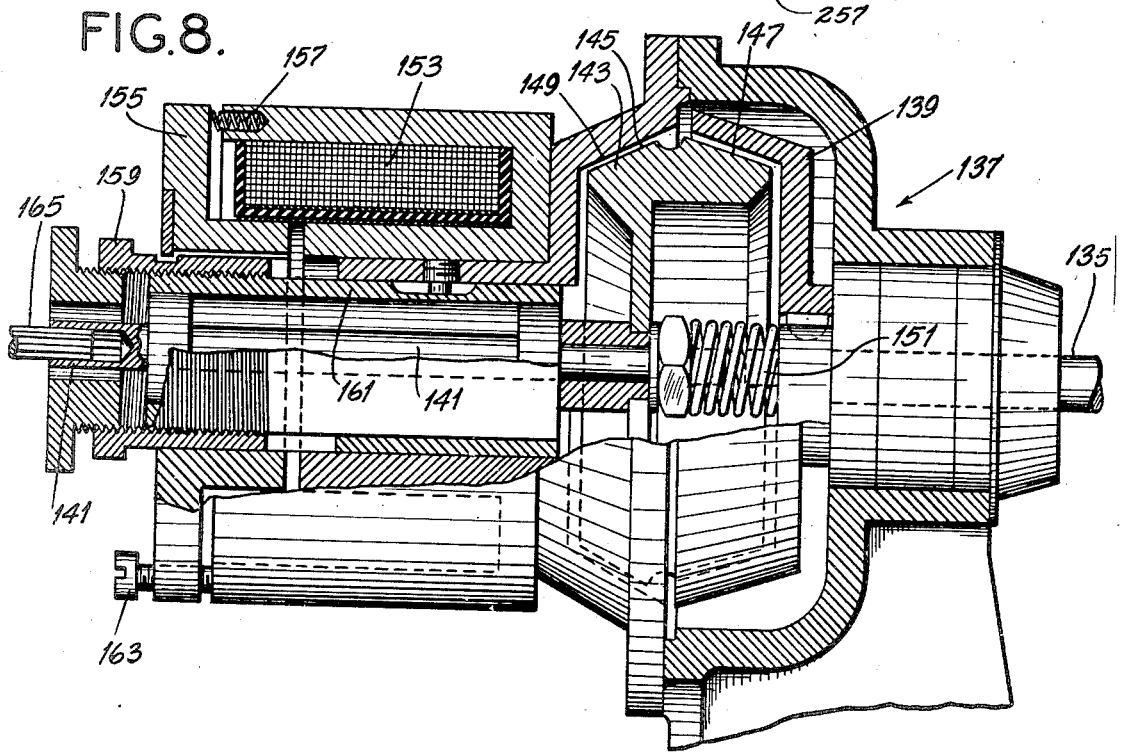
Fig. 8 is an axial cross section of a magnetic clutch.

All of the parts of the apparatus now having been described, it is advisable to consider how they are connected together electrically. Fig. 7 shows the electrical circuits employed.

Numerals 255 and 257 indicate the wires of a main supply circuit. Wire 231 connects one side of the electro-magnet 223 to supply wire 257. Wire 233 connects the other side of the electro-magnet 223 to switch 241, the other side of which is in turn connected to the supply wire 255. A manual switch button 259 (located on the front of shelf 47, for example, as shown in Figures 2 and 3) is desirably connected in parallel with the switch 241, to provide for emergency actuation of the electro-magnet 223 if for any reason the switch 241 fails.

The light source 45 is connected, for example, directly to the power lines 255 and 257, a manually operable switch 261 being interposed.

The brush 205 is connected by a wire 263 to the relay 133. The opposite wire 265 from the relay 133 is connected to the electro-magnetic clutch 137. The second wire 267 of the clutch 137 is connected to power wire 255. The brush 203 is connected by a wire 269 to the opposite power wire 257. Thus the brushes 203 and 205, the relay 133, and the electro-magnetic clutch 137 are all connected in series. The switch contacts 227 and 229 are connected by their wires 235 and 237 to the wires 263 and 269, respectively, so that they are in parallel connection with the brushes 203 and 205.

Wires 271 and 273 connect the photosensitive device 101 to the amplifier 131, and the amplifier output is connected to the relay 133 by wires 275 and 277.

The relay 133, it will be recalled, was described as being of such a type as to close an outside circuit (now identified as the circuit from wire 263 to wire 265) only when the photosensitive device is not generating a current in wires 275 and 277, through the amplifier. This arrangement can of course be reversed, if the counters 175 and 177 are arranged as subtractive types, or if the operator is content with an expression for the area of the reflector not covered by the work piece, from which, knowing the area of the reflector, he can ascertain the area of the work piece by a simple subtraction.

Before a current can flow to the magnetic clutch 137, however, regardless of the condition of the relay 133, the brushes 203 and 205 must be connected together, or, that is to say, the one-turn clutch 79 must be in the course of rotation. A rotation of the clutch 79, as has been described, is expressive of one complete measure of the work piece; hence the clutch 137 is operated by the relay 133 only during one complete measure, and over measurement of the work piece is thus avoided.

Operation

A great deal of the operation of this embodiment of the invention has been described in connection with the description of the various component parts, and will not be repeated herein.

It will readily be seen that, in the present embodiment of the invention, there is no mechanical connection between the drive for the work feeding and scanning device feeding mechanisms, on the one hand, and the scanning device and integrating mechanisms, on the other hand. No connection need be provided, because of the automatic provision against over measurement, as hereinbefore described, but the rate of scanning should be sufficiently fast (as determined by the speed of the motor 77) that at least one complete measurement may be had while the scanning device is in its phase of movement with the work piece. This latter time is determined by the rotational speed of the main drive shaft 25, and the distance between the centers of shafts 103 and 111 of the scanning device feed mechanism chain 119. Ordinarily it is found advisable to have the motor 77 rotate at such a speed that a scan is completed in approximately two-thirds the time that the scanning device and work piece are moving together.

In carrying out measurements, assuming that all devices are being actuated in the manner described, frames containing the hides to be measured are fed into the slides 7 and 9 at the right-hand end of the apparatus. At suitably spaced intervals, the lugs 17 on chain 11 pick up these frames and commence them on their left-ward journey. After they have moved a certain distance, they come into juxtaposed movement with the scanning device, which, through its feed mechanism, has just been returned to its extreme right-hand position, and is commencing a leftward movement. The scanning belt is moving at all times, and the light source 49 is operating. Hence the scanning device is at all times projecting scanning beams. However, until the carriage 27 passes over and actuates the switch 241, the integrating mechanism is held out of operation.

Upon actuation of the switch 241, however, the integrating mechanism is freed for operation. At this instant, it makes no difference whatever as to what position the scanning beam is in, because, by operation of the one-turn clutch mechanism 79, the integrating mechanism will be free for operation during a complete measurement. In other words, the scanning of a given hide may commence at any point on the hide, with assurance that the integrating mechanism will be cut out of circuit when the scanning beam again reaches that point on its next scanning cycle. A scanning cycle is assumed to be a complete traverse by the scanning beam of the reflector, commencing at the upper left-hand corner of the reflector, moving in a straight line to the upper right-hand corner, and repeating this movement at progressively lower vertical positions, until a lowermost beam traverses the reflector from the lower left-hand corner to the lower right-hand corner. Scanning cycles follow each other with no intervening interval, because of the positioning of the holes 65 on the scanning belt 59.

During the scan of the work piece, the photosensitive device 101 will be de-energized each time the scanning ray, in its horizontal travel, intercepts the edge of the work piece, and will remain deenergized until the ray passes over the opposite edge of the work piece. During de-energization of the photo-sensitive device 101, the relay 133 is operative to actuate the magnetic clutch 137 to drive the counters 175 and 177. Since the scanning beam is straight and moves at a constant rate, the duration of this de-energization is an accurate expression, mathematically, of the length of the scanned line on the work piece. The total expression on the counters 175 and 177 is, therefore, an expression of the length of the work piece along the scanned line. If successive scanning lines are spaced apart unit vertical distances, the length of the scanned line is an expression of the area of a strip of the work piece of unit width, whereof the scanned line is along the center, within the limits of accuracy imposed by the width of the unit, and the total length of all the scanned lines during a complete measurement is an expression of the total area of the work piece. Thus, the counters 175 and 177 show, at the end of a complete measurement, the total area of the work piece. By suitably adjusting the gear ratio in gear multiplier box 83, the apparatus may be made accurately to measure the area of the work piece presented to it. The accuracy of measurement of course increases as the width of the scanned paths decreases. For hide measurement, as hereinbefore stated, a width of one inch for each scanned path yields results of sufficiently high accuracy, in fact, accuracy considerably higher than that achieved by any of the mechanical area measuring systems in use today.

Because of the speed relationship hereinbefore described, a complete measurement of a work piece is had prior to the completion of the interval of joint travel of the scanning mechanism and the work piece, so that, when the carriage 27 reaches its extreme left hand position, the presented work piece has been measured and is ready to be delivered from the apparatus. The carriage 27 then moves to the right, and is thus returned to its extreme right-hand position to commence the measurement of another work piece, while the measured work piece travels along on the slides 7 and 9 ultimately to be delivered from the left-hand end of these slides. Usually the unit piece counter 177 is returned to zero position while the carriage 27 is moving to the right, either manually or by automatic return mechanism (not shown), but the totalizing counter 177 is allowed to add the areas of successive work pieces within the limits of, say, a given consignment of hides to be measured.

In place of the merely visual area-indicating counters 175 and 177, or in addition thereto, the magnetic clutch 137 may be arranged to drive mechanism which prints the measured area on the work piece itself, mechanism which makes a printed ledger record of the work piece number and its area, or any other suitable recording mechanism. Mechanisms of this general type are disclosed in detail in the copending patent application of the present inventor Jones and Ernest C. Whitney, Serial No. 37,709, filed August 24, 1935, to which reference is hereby directed.

*Alternative embodiments*

The apparatus hereinbefore described is capable of embodiment in many different forms, some of which will be explained hereinafter. Insofar as practicable, the alternative forms relating to one particular portion of the apparatus will be grouped together for description.

Figures 21, 22, 23, and 24 show a reflector that may be substituted in the foregoing embodiment for the spherical mirror 97. The reflector in this instance is made up of a large number or relatively small, square plane mirrors 343, each of which is so positioned as to reflect light from the front lens 57 back to the photo-sensitive element 101. The front of this reflector, as shown in Fig. 22, resembles quadrille paper. It will be understood that each mirror 343 is set at its own angle, both in the vertical and in the horizontal planes, depending upon its position with respect to the dimensions of the reflector. If in this embodiment the edge dimensions of the small square mirrors are made equal to the width of the scanned paths (or, to correspond to the example hereinbefore recited, one inch on a side), this reflector operates with substantially the same accuracy as the spherical mirror reflector 97, so far as the area measurement is concerned.

The square mirrors of the Fig. 21 embodiment may be replaced by small round spherical mirrors if desired. The reflector will then have the appearance indicated in Fig. 27, although Fig. 27 is presented for another purpose. In this case, the front lens 57 should be set at its focal distance from the scanning belt 59, in which event it will focus a pencil of parallel rays on the reflector; if the radius of curvature of the small mirrors is then made equal to twice their distance from the optical center of the front lens 57, they will act like lenses and condense the parallel scanning rays to a focus on the photosensitive cell 101.

Still another form of reflector is indicated in Figures 28 and 29. Here the reflecting surface is a plane diffusing one, as indicated in numeral 345. A convenient form of surface for this purpose is a motion picture projection screen. Other diffusely reflecting screens may also be used. In this instance, no attempt is made to focus the reflected scanning rays, but photosensitive cells 347 are placed in position on all four sides of the reflector 345 to respond to the illumination thereof by the scanning beam. The four photosensitive cells 347 are connected in parallel, so that actuation of any one or more of them will pass current to the relay 133. In this embodiment, use is made of the difference in the amount of reflected light from the work piece (such as a dark-colored leather hide) and from the screen or reflector 345. The scanning light beam will actuate at least one of the cells when it is traversing the reflector, but will not actuate any of the cells sufficiently to cause the relay 133 to be actuated while it is traversing the work piece.

Figures 28 and 30 show a modification in another respect entirely. It is known that alternating current amplification is more satisfactory than direct current amplification. With photosensitive devices, it is well to provide for a pulsating light action on the cell, so that alternating current amplification systems may be used. This pulsating light action may be obtained in any one of several ways. Figures 28 and 30 show means for producing pulsating light in the form of a so-called light chopper disc 349, which comprises a disc with an independent motor drive 351 on its axis. The disc 349 is equipped with circumferentially or peripherally disposed openings 353, any one of which is sufficiently large to pass any scanning beam coming from the belt 59. The disc 349 is placed in position immediately in front of the scanning belt 59, as shown in Fig. 28, and rotated at a relatively high rate of speed, its effect during scanning being to break up the scanning rays into a series of intermittent beams of light, which impose on the photosensitive device 101 in a pulsating manner. The disc 349 should be rotated at such a speed, for example, that it chops the scanning beam into as many as the order of ten to a hundred intermittent beams of light per linear inch of horizontal travel in the scanning operation. When such a device is used, the scanning is not done, strictly speaking, with one beam per horizontal traverse, but with one series of thousands of beams of light per horizontal travel.

Many other methods are available for producing pulsating light, such as, for example, illuminating the lamp 49 through a commutator system to cause it to flash on and off in the manner of a stroboscope. Or, a suitable fast-acting shutter system can be used between the light source 49 and the rear lens 55.

The reflector system may be done away with entirely if it is replaced by a photosensitive device or devices which occupy the entire area represented by the reflector. Such an arrangement is shown in Figures 25 and 26. In these figures, the screen behind the work piece 3 comprises a bank of photosensitive devices 355 of tubular shape, arranged in parallel order so that the entire area is substantially covered with photosensitive regions. All of these photosensitive devices 355 are connected in parallel, and into the circuit shown in Fig. 7 in the same manner as if they were all one photosensitive device. In this embodiment the scanning beam, if it is not intercepted by the work piece, plays directly upon the photosensitive devices, and thus operates the detection system in precisely the same manner as in those embodiments where the beam is reflected back to the photosensitive device.

As a matter of fact, if the area of the work piece to be scanned is not too great, the entire background may be made as one photosensitive device of large area.

In Fig. 27 is shown a modification of the Fig. 25 embodiment wherein the tubular photosensitive devices are replaced by a quadrille arrangement of small photosensitive devices 357, all of which are, as usual, connected in parallel. The indicated round type of photosensitive devices 357 simulates cells of the Weston "Photronic" type, although it will readily be seen that a substantial coverage of the area with any type of device will be satisfactory.

In Figures 31, 32, 33, 34, and 35 is shown a modified form of area measuring apparatus which is in many respects similar to the first embodiment described, but which differs therefrom in the form of scanning belt employed, the means for moving said belt, and structural matters incident to these modifications. In these figures, many of the parts are so similar to those of the first embodiment that they will not be re-described.

In this embodiment the endless scanning belt 35 is replaced by a reciprocating scanning frame 359. The frame has the advantage over the belt, in that it can be made quite rigid, thus eliminating at the start any disadvantages that might arise in the prior embodiment by reason of the "whip" or other unwanted movement of the scanning belt, and it permits the use of a thinner diaphragm.

The frame 359 is shown in greater detail in Figures 34 and 35. It will be seen that it comprises a relatively long bar of relatively thick (and hence rigid) material, such as steel, into the central portion of which is secured a very thin diaphragm 361 that is punctured with a series of scanning holes 363, the spacing and dimensioning of which is determined in the same manner as in connection with the scanning belt of the prior embodiment. In this respect only does the arrangement of holes 363 differ from that of the holes in the belt 59, to-wit: only one sloping series of holes is provided instead of two.

The frame 359 is supported slidably in brackets 365 which extend from a vertical plate 367 supported, by various means shown, on the upright posts 41 of the reciprocating carriage 27, which is quite similar to the carriage of the first embodiment. The frame 359 is given a reciprocating motion in operation by the following means:

A drive shaft 369 is provided, extending parallel to the direction of motion of the carriage 27. This drive shaft is driven from the main drive shaft 25 (as shown in Fig. 1) by a suitable gear and chain arrangement. The drive shaft 369 is now used to drive the movement of the carriage 27, by means of spiral gears 371 and 373, the latter of which is mounted on the shaft 111 of the carriage chain sprocket wheel 117. However, more important, the shaft 369 drives, by means of sprocket wheels 375 and 377 and a chain 379, a long shaft 381, which is positioned behind the upright posts 41 and above the cross pieces 33 of the carriage 27. The ends of the shaft 381 are supported in suitable bearings 383 and 335, which are widely enough spaced so as not to interfere with the movement of the carriage 27. The shaft 381 is parallel to the tracks 39 upon which the carriage 27 moves. The shaft 381 is grooved throughout its length to receive a spline, as will be described.

Mounted on the left hand cross piece 33 of the carriage 27 in the manner indicated in Fig. 33 is a sprocket wheel 387, the hub of which slides freely on the shaft 381 and is provided with a spline 389 engaging the spline groove of the shaft. The hub is, however, enclosed in a bearing 391 mounted on the cross piece 33, so that the sprocket wheel 387 is driven to rotate by the shaft 381, but moves back and forth thereon along with the carriage 27. The sprocket wheel 387 receives a chain 393 which drives a sprocket wheel 395 mounted on a shaft 397 which is in turn mounted in a bearing 399 secured on the upright post 41. The shaft 397 also has a spiral gear 401 thereon, which meshes with and drives a cooperating spiral gear 403 mounted on a shaft 405 which is parallel to the side piece 33. The shaft 405 is supported in a bearing 407 mounted on a cross-piece 409 in turn mounted on the post 41. The inner end of shaft 405 carries a sprocket wheel 411.

A similar sprocket wheel 413 is mounted on a shaft 415 supported in a bearing 417 on the post 41 at the opposite side of the carriage 27. The sprocket wheels 411 and 413 support and drive a chain belt 419, which thus rotates in the same manner as the chain belt 119 that drives the carriage 27. The analogy is carried even further by the fact that the frame 359 has a depending slotted portion 421, the slot of which receives a pin mounted on the chain 419 and similar to the pin 125 of the carriage drive. Thus the moving of the chain belt 419, as actuated through the series of driving elements from the shaft 369, causes reciprocation of the scanning frame 359.

The integrating mechanism of this embodiment has been omitted from Figures 31 and 32 for clarity, but it will readily be seen that it is much the same as the integrating mechanism of the first embodiment. However, the one turn clutch mechanism is now not needed, since the scanning frame 359 has but one cycle of scanning holes therein and an over measurement is an impossibility. However, effective scanning should be accomplished only while the carriage is moving from right to left, and not while it is moving from left to right. For this purpose a switch should be included in the integrator control circuit that permitted the passage of current to the integrating mechanism only during the desired movement of the scanning frame. Such a switch could well be operated by the pin on the scanning frame chain drive 419, being disposed to be closed, for example, when said pin is in its uppermost position (and hence when the scanning frame is moving to the left), and otherwise open.

The mechanical drive for the integrating mechanism can well be the shaft 405 or the shaft 415, both of which rotate in a manner accurately representing the linear travel of the scanning frame.

The scanned paths on the work piece 3 with this embodiment will, it is seen, be of precisely the same type as the scanned paths of the first embodiment for the progression of scanning holes passing before the projection system is substantially the same as in the case of the first embodiment, even if in this embodiment the holes are supported on a frame instead of an endless belt.

In this embodiment the scanning frame is driven from the same power source as the carriage 27 and the work frame feeding belt 11. Hence, in order to assure that a complete measurement will take place while the carriage 27 and frame 1 are moving together, the gear ratio from the shaft 369 to the chain belt 419 should be arranged to make said chain belt 419 move at a higher speed than the chain belt 119 driving the carriage 27.

The optical and detection systems of this embodiment are similar to those of the first embodiment, and need not be redescribed herein.

In all of the foregoing embodiments of the invention, the work piece has been held still relative to the scanning mechanism while it has been measured, even though both the work piece and the scanning mechanism have been moving as the area was measured. This has necessitated the movement of the scanning beam in two dimensions, that is, both horizontally and vertically. In the embodiment of the invention shown in Figures 36, 37, 38, 39, and 40, the work piece is moved in a controlled manner relative to the scanning mechanism during the scanning, its relative movement establishing one of the dimensions, so that the scanning beam needs to travel only in the other dimension. The embodiment of these figures has the further advantage that the work-pieces to be measured do not need to be placed in the frames 1 for measurement. This last feature is of advantage in connection with certain modern tanning procedures, for example, where the hides are not placed on frames 1 and where to do so would require additional work.

Referring now more particularly to Figures 36, 37, 38, 39, and 40, numeral 423 indicates a horizontal table that is supported on vertical side standards 425. Near the front portion of the table 423 are mounted two pairs of feed rollers, 427 and 429, and 431 and 433, respectively. Both pairs of rollers are arranged with their respective surfaces tangent, the top rollers 427 and 431 preferably being of a floating rather than a journalled type in order to provide for pressure between the respective bottom rollers 429 and 433. The table 423 is discontinued in the region of the rollers in order that said rollers may grip and feed a work piece 435 fed therebetween along the top of the table 423.

The rollers are driven to feed the work piece forwardly in the following manner: The roller 427 is provided with a gear 437, outside the standard 425, which meshes with a similar gear 439 on the roller 429. The roller 431 is similarly provided with a gear 441 meshing with a gear 443 on the roller 433. A pinion 445 connects the gears 439 and 443. On the shaft of roller 433 is a worm gear 447 meshing with a worm wheel 449 on a vertical shaft 451. The shaft 451 is supported in a bearing 453 mounted on the standard 425, and in a second bearing 455 mounted on a shelf 457 at the top of upright extensions 459 of standards 425. The shaft 451 is rotated by a motor 461 (mounted on a shelf below the table 423) through bevel or mitre gears 463 and 465.

The rollers are thus driven in such a manner as to feed the work piece 435 along the table 423 in a rightward movement at a controlled speed.

The shelf 457 mounts the projection portion of the scanning mechanism of the present embodiment. This mechanism comprises a pair of drums 467 and 469 mounted respectively on shafts 471 and 473 supported respectively in bearings 475 and 477. The shafts 471 and 473 are not parallel to the standards 425, but are arranged at an angle thereto determined by the rate of feed of the work. This angle may be expressed, for the present, as the one determined by the width of the table 423 (representing the length of a scanned path) and the linear travel of the work piece during the time required for the scanning beam to traverse the table 423 one time.

Shaft 471 extends beyond the bearing 475 and mounts a worm gear 479 which engages a worm wheel 481 at the upper end of shaft 451. Thus the shaft 451 drives the scanning mechanism as well as the work feeding mechanism. A sprocket wheel 483 is mounted on the shaft 471 intermediate the drum 467 and the bearing 475. A similar, same-size sprocket wheel 485 is mounted on the shaft 473 intermediate the drum 469 and the bearing 477. A chain belt 487 connects the sprocket wheels 483 and 485, and thus the drums 467 and 469 are driven to rotate at the same speed.

The drums 467 and 469 mount an endless scanning belt 489 that is similar in size and shape to the scanning belt 59 of the first embodiment. That is to say, the belt 489 is of thin material and is provided with holes 491, similar to the holes 63 in the belt 59, for engaging suitable projections in the drums 467 and 469. The belt 489 is additionally provided with a series of scanning holes 493, but these holes are arranged on a straight line intermediate the sides of the belt, rather than on a sloping line as was the case of the scanning holes 65 in the belt 59, because in the present embodiment the scanning beams are obliged to travel through only one dimension, the travel in the other dimension being supplied by the feed of the work. The same rules as set forth in connection with the longitudinal spacing of the holes in the belt, and the diameter of the scanning holes for belt 59, however, apply to belt 489.

The present embodiment is provided with a light source 495 which is mounted on a block 497 supported by shelf 457, in position directly above the scanning holes 493 in the belt 489. As in the first embodiment, a back lens 499 and a front lens 501 comprise the optical system of the present embodiment. The optical axis, projected downwardly, intersects the region of the table 423 midway between the standards 425, and midway between the rollers 429 and 431.

The scanning mechanism of the present embodiment includes a reflector mirror 503 mounted in an interval in the table 423 beneath the level of the work piece 435. The mirror 503 is cylindrical or spherical. A cylindrical mirror may be used as the scanning beams of the present embodiment do not move through two dimensions. The geometrical center of the cylinder of the mirror 503 is approximately at the optical center of the front lens 501. The mirror 503 is mounted at slight slope, so as to reflect rays from the lens 501 to a photosensitive device 505 mounted as near the lens 501 as practicable, on the under side of shelf 457.

The integrating mechanism of the present embodiment is mounted on a cross piece 507 supported between the uprights 459 (see Fig. 39). It comprises a shaft 509, one end of which carries a bevel or mitre gear 511 engaging a similar gear 513 on the vertical drive shaft 451. The shaft 509 is supported in a bearing 515 mounted on the upright 459. The shaft 509 drives a gear multiplier 517, which is similar to the multiplier 89 of the first embodiment, which in turn drives an electro-magnetic clutch 519, similar to the clutch 137 of the first embodiment, which in turn drives counters 521 and 523, similar to the counters 175 and 177 of the first embodiment. The electro-magnetic clutch 519 is connected through a relay and amplifier to the photosensitive device 505, as in the first embodiment.

The operation of this embodiment is as follows: A work piece 435 is fed along the table 423 until it is gripped by the rollers 427 and 429. Thereafter it is fed by the rollers at a predetermined rate. As it passes over the mirror 503 it intercepts a succession of scanning beams coming from the lens 501, each of which beams is moving in the manner of unfolding a fan from the left to the right, view as in Fig. 38. The angle of the scanning belt and associated mechanism now becomes explainable. If it were not for this angle, the path of the scanning beam on the work piece would be a sloping line, because while the scanning beam would be moving across the work at right-angles to the line of travel of the work, still the work would be advancing while the beam stayed in the same perpendicular plane. Hence the scanning belt is placed at such an angle, relative to the work, that the scanning beam traces a path on the work that is at right angles to the direction of travel of the work. This facilitates accurate measurement and integration of the area of the work. It is to be noted that the angle of the scanning belt 489 is exaggerated in the drawings over what might normally be encountered in practice.

As soon as one beam has completed a scan, another beam is produced by another hole 493 passing into the lens field. This beam is in the same plane as the last beam, but the work has meanwhile advanced, so that in reality the subsequent scanning beam is scanning another increment of the work.

As in the first embodiment, the electromagnetic clutch 519 is actuated to turn the counters 521 and 523 whenever a scanning beam is intercepted by the work piece 435. Since the beams move in straight lines across the work, and since they move at a uniform rate (because the belt 489 is moving at a uniform rate), and since the work itself is advancing at a uniform rate, all as controlled directly from the speed of rotation of the shaft 451, this same shaft may be used to drive the clutch 519, the gear multiplier box 517 providing for conversion of the results to the proper units of area.

Many of the mechanical features of the first embodiment, such as the rollers preventing the whip of the scanning belt, can be used to advantage in the present embodiment.

It is to be noted that most of the modifications described herein can be used interchangeably with each other, or with the three major forms of apparatus represented by Figures 2, 31 and 36.

It may here be pointed out that photosensitive devices are essentially detectors of radiation. Thus, the radiations useable in the present invention are not confined to visible light rays but may include supersonic waves, infra-red rays, and ultra-violet rays, providing these radiations are not harmful to the material being measured, and provided suitable radiation detectors are used. All such radiations are comprehended to be within the scope of the term "light" as herein used.

It will be evident from the foregoing that the invention provides machines capable of handling a wide variety of work including not only hides, skins, lumber and the like, but also smaller articles such as shoe patterns, and the various irregular surfaces and charts produced in scientific and research work, the areas of which must be determined with a high degree of accuracy. For all these purposes the invention effects an important saving in labor and produces more accurate results.

In view of the above, it will be seen that the several objects of the invention are achieved and other advantageous results attained.

As many changes could be made in carrying out the above constructions without departing from the scope of the invention, it is intended that all matter contained in the above description shall be interpreted as illustrative and not in a limiting sense.

We claim:

1. Area measuring apparatus comprising means for supporting a work piece the area of which is to be measured, a light source, means defining a beam of light from said source to the work piece, means for moving the beam in a straight line path across the work piece, and photosensitive means positioned to detect when the beam of light is intercepted by the work piece.

2. Area measuring apparatus comprising means for supporting a work piece the area of which is to be measured, a light source, means defining a beam of light from said source to the work piece, means for moving the beam in a straight line path across the work piece, photosensitive means positioned to detect when the beam of light is intercepted by the work piece, and integrating means electrically controlled by said photosensitive means and mechanically driven in accordance with the rectilinear speed of said beam.

3. Area measuring apparatus comprising means for supporting a work piece the area of which is to be measured, a light source, means defining a plurality of beams of light from said source to the work piece, means for moving the beams in a succession of parallel straight line paths spaced at uniform distances from each other across the work piece, and photosensitive means positioned to detect when the beams of light are intercepted by the work piece.

4. Area measuring apparatus comprising means for supporting a work piece the area of which is to be measured, a light source, means defining a plurality of beams of light from said source to the work piece, means for moving the beams in a succession of parallel straight line paths spaced at uniform distances from each other across the work piece, photosensitive means positioned to detect when the beams of light are intercepted by the work piece, and integrating means electrically controlled by said photosensitive means and mechanically driven in accordance with the rectilinear speed of said beams.

5. Area measuring apparatus comprising means for supporting a work piece the area of which is to be measured, a light source, means defining a plurality of successive beams of light from said source to the work piece, means for moving the beams in succession, with all of the beams in a single plane, in straight line paths across the work piece, means moving the work piece so that successive beams traverse adjacent, equally spaced parallel bands on the work piece, and photosensitive means positioned to detect when the beams of light are intercepted by the work piece.

6. Area measuring apparatus comprising means for supporting a work piece the area of which is to be measured, a light source, means defining a plurality of successive beams of light from said source to the work piece, means for moving the beams, in succession, with all of the beams in a single plane, producing spots that move in straight line paths across the work piece, photosensitive means positioned to detect when the beams of light are intercepted by the work piece, and integrating means electrically controlled by said photosensitive means and mechanically driven in accordance with the rectilinear speed of said beams.

7. Area measuring apparatus comprising means for supporting a work piece the area of which is to be measured, reflecting means behind the work piece, a light source, means defining a beam of light from said source to the reflecting means, means for moving the beam in a straight line path across the reflecting means, and photosensitive means adapted to detect differentially when the beam of light is intercepted by the work piece, and when it falls upon the reflecting means.

8. Area measuring apparatus comprising means for supporting a work piece the area of which is to be measured, reflecting means behind the work piece and of sufficient area to surround the entire work piece, a light source, means defining a plurality of successive beams of light from said source to the reflecting means, means for moving the beams in a succession of parallel straight line paths spaced at uniform distances from each other across the reflecting means, and photosensitive means adapted to detect differentially when the beams of light are intercepted by the work piece, and when they fall upon the reflecting means.

9. Area measuring apparatus comprising means for supporting a work piece the area of which is to be measured, reflecting means behind the work piece and of sufficient area to surround the entire work piece, a light source, means defining a plurality of successive beams of light from said source to the reflecting means, means for moving the beams in a succession of parallel straight line paths spaced at uniform distances from each other across the reflecting means, photosensitive means adapted to detect differentially when the beams of light are intercepted by the work piece, and when they fall upon the reflecting piece, and integrating means electrically controlled by said photosensitive means and mechanically driven in accordance with the rectilinear speed of said beams.

10. Area measuring apparatus comprising means for supporting a work piece the area of which is to be measured, reflecting means behind the work piece and of sufficient area to extend beyond the edges of the work piece, a light source, means defining a plurality of successive beams of light from said source to the reflecting means, means for moving the beams in a succession of straight line paths in the same plane across the reflecting means, means moving the work piece so that successive beams traverse adjacent, equally spaced parallel bands on the work piece, and photo sensitive means adapted to detect differentially when the beams of light are intercepted by the work piece, and when they fall upon the reflecting means.

11. Area measuring apparatus comprising means for supporting a work piece the area of which is to be measured, reflecting means behind the work piece and of sufficient area to extend beyond the edges of the work piece, a light source, means defining a plurality of successive beams of light from said source to the reflecting means, of means for moving the beams in a succession of straight line paths in the same plane across the reflecting means, means moving the work piece so that successive beams traverse adjacent, equally spaced parallel bands on the work piece, photosensitive means adapted to detect differentially when the beams of light are intercepted by the work piece, and when they fall upon the reflecting means, and integrating means electrically controlled by said photosensitive means and mechanically driven in accordance with the rectilinear speed of said beams.

12. Apparatus as set forth in claim 7, in which the reflecting means is of the specular type.

13. Apparatus as set forth in claim 7, in which the photosensitive means comprises a cell mounted immediately adjacent to the optical system, and the reflecting means is designed so that all points of its surface are capable of reflecting light from the optical system substantially to the said cell.

14. Apparatus as set forth in claim 8, in which the photosensitive means comprises a cell mounted immediately adjacent to the optical system, and the reflecting means comprises a substantially spherical mirror, curved about a center represented substantially by the optical center of said optical system.

15. Apparatus as set forth in claim 8, in which the photosensitive means comprises a cell mounted immediately adjacent to the optical system, and the reflecting means comprises a quadrille of relatively small mirrors, each of which is positioned to reflect beams of light from the optical system to the said cell.

16. Apparatus as set forth in claim 7, in which the reflecting means comprises a diffuse reflector, and the photosensitive means comprises a plurality of tubular photosensitive cells electrically connected in parallel and disposed about the periphery of said reflector, in such manner that any illumination of the reflector is detected by at least one of the cells.

17. Apparatus as set forth in claim 10, in which the photosensitive device comprises a cell mounted immediately adjacent to the optical system, and the reflector comprises a substantially cylindrical mirror sloped at such an angle as to reflect light from said optical system to said cell, and curved about an axis passing substantially through the optical center of said optical system.

18. Apparatus as set forth in claim 1, in which the photosensitive means comprises a surface positioned behind the work piece, the said surface being photosensitive over substantially its entire area.

19. Apparatus as set forth in claim 1, in which the photosensitive means comprises a surface positioned behind the work piece, the said surface comprising a bank of tubular photosensitive devices arranged in parallel relationship and electrically connected in parallel.

20. Apparatus as set forth in claim 1, in which the photosensitive means comprises a surface positioned behind the work piece, the said surface comprising a quadrille arrangement of individually relatively small photosensitive cells arranged with their photosensitive surfaces substantially all in one plane, and electrically connected in parallel.

21. Area measuring apparatus comprising means for supporting a work piece the area of which is to be measured, means for continuously moving the work piece in the plane of its surface the area of which is to be measured, a carriage, scanning means mounted on said carriage, said scanning means being adapted to scan the area of said work piece, photosensitive means adapted to detect the scanning operation, and means for moving the carriage.

22. Area measuring apparatus comprising means for supporting a work piece the area of which is to be measured, means for continuously moving the work piece in the plane of its surface the area of which is to be measured, a carriage, scanning means mounted on said carriage, said scanning means being adapted to scan the area of said work piece, photosensitive means adapted to detect the scanning operation, and means for moving the carriage in such manner that said carriage and said work piece are moving together, at the same rate, while said scanning operation is progressing.

23. Area measuring apparatus comprising means for supporting a work piece the area of which is to be measured, means for continuously moving the work piece in the plane of its surface the area of which is to be measured, a carriage, scanning means mounted on said carriage, said scanning means being adapted to scan the area of said work piece, photosensitive means adapted to detect the scanning operation, and means for moving the carriage in such manner that said carriage and said work piece are moving together, at the same rate, while said scanning operation is progressing, and thereafter said carriage is moved in a direction opposite to that of the work piece to commence a scanning operation on another work piece.

24. Area measuring apparatus comprising means for supporting a work piece the area of which is to be measured, means for continuously moving the work piece in the plane of its surface the area of which is to be measured, a carriage, scanning means mounted on said carriage, said scanning means being adapted to scan the area of said work piece, photosensitive means adapted to detect the scanning operation, means for moving the carriage in such manner that said carriage and said work piece are moving together, at the same rate, while said scanning operation is progressing, and thereafter said carriage is moved in a direction opposite to that of the work piece to commence a scanning operation on another work piece, and means rendering the scanning means ineffective to measure area except at such times as the carriage and work pieces are moving together.

25. Area measuring apparatus comprising means for supporting a work piece the area of which is to be measured, means for continuously moving the work piece in the plane of its surface the area of which is to be measured, a carriage, scanning means and area integrating means cooperating therewith mounted on said carriage, said scanning means being adapted to scan the area of said work piece, photosensitive means adapted to detect the scanning operation and actuate the integrating means, means for moving the carriage in such manner that said carriage and said work piece are moving together, at the same rate, while an area measuring operation is progressing, and thereafter said carriage is moved in a direction opposite to that of the work piece to commence an area measuring operation on another work piece, and means rendering the integrating means ineffective to record areas except at such times as the carriage and the work piece are moving together.

26. Area measuring apparatus comprising means for supporting a work piece the area of which is to be measured, means for continuously moving the work piece in the plane of its surface the area of which is to be measured, a carriage, scanning means and area integrating means cooperating therewith mounted on said carriage, said scanning means being adapted to scan the area of said work piece, photosensitive means adapted to detect the scanning operation and actuate the integrating means, means for moving the carriage in such manner that said carriage and said work piece are moving together, at the same rate, while an area measuring operation is progressing, and thereafter said carriage is moved in a direction opposite to that of the work piece to commence an area measuring operation on another work piece, means rendering the integrating means ineffective to record areas except at such times as the carriage and the work piece are moving together, and means rendering the integrating means ineffective to record area after any work piece has been completely measured.

27. Area measuring apparatus comprising means for supporting a work piece the area of which is to be measured, means for continuously moving the work piece in the plane of its surface the area of which is to be measured, a carriage, scanning means and area integrating means cooperating therewith mounted on said carriage, said scanning means being adapted to scan the area of said work piece, photosensitive means adapted to detect the scanning operation and actuate the integrating means, means for moving the carriage in such manner that said carriage and said work piece are moving together, at the same rate, while an area measuring operation is progressing, and thereafter said carriage is moved in a direction opposite to that of the work piece to commence an area measuring operation on another work piece, means rendering the integrating means ineffective to record areas except at such times as the carriage and the work piece are moving together, and means rendering the integrating means ineffective to record area after any work piece has been completely measured, said last-named means comprising means driven directly by the scanning means.

28. Apparatus as set forth in claim 2 including means preventing the integrating means from functioning after the area of the work piece has been completely measured.

29. Apparatus as set forth in claim 9 including means preventing the integrating means from functioning after the area of the work piece has been completely measured.

DONALD C. STOCKBARGER.
JOHN L. JONES.